(12) United States Patent
Homrighous et al.

(10) Patent No.: US 9,435,502 B2
(45) Date of Patent: Sep. 6, 2016

(54) SOLAR POWERED SIGNS INCLUDING SOLAR PANELS AND LIGHT-EMITTING DIODES

(71) Applicants: Greggory Tate Homrighous, St. Louis, MO (US); Frank Bryan Homrighous, St. Louis, MO (US); Kurt Liepmann, St. Louis, MO (US)

(72) Inventors: Greggory Tate Homrighous, St. Louis, MO (US); Frank Bryan Homrighous, St. Louis, MO (US); Kurt Liepmann, St. Louis, MO (US)

(73) Assignee: Greggory Tate Homrighous and Frank Bryan Homrighous, St. Louis, MO (US)

( * ) Notice: Subject to any disclaimer, the term of this patent is extended or adjusted under 35 U.S.C. 154(b) by 305 days.

(21) Appl. No.: 14/033,791

(22) Filed: Sep. 23, 2013

(65) Prior Publication Data

US 2014/0092586 A1  Apr. 3, 2014

Related U.S. Application Data

(60) Provisional application No. 61/706,801, filed on Sep. 28, 2012, provisional application No. 61/863,304, filed on Aug. 7, 2013.

(51) Int. Cl.
| | |
|---|---|
| *A47F 11/00* | (2006.01) |
| *F21S 9/03* | (2006.01) |
| *G09F 9/33* | (2006.01) |
| *G09F 27/00* | (2006.01) |

(52) U.S. Cl.
CPC ............. *F21S 9/037* (2013.01); *G09F 9/33* (2013.01); *G09F 27/005* (2013.01); *G09F 27/007* (2013.01); *Y02B 10/10* (2013.01)

(58) Field of Classification Search
CPC ........ F21S 9/037; G06F 9/33; G06F 27/005; G06F 27/007; Y02B 10/10
USPC ........ 362/125, 84, 97.4, 183; 40/572, 606.01
See application file for complete search history.

(56) References Cited

U.S. PATENT DOCUMENTS

| | | | | |
|---|---|---|---|---|
| 5,526,236 A | * | 6/1996 | Burnes | G09G 13/04 257/E25.028 |
| 2008/0005943 A1 | * | 1/2008 | Chao | G09F 13/22 40/544 |
| 2009/0183405 A1 | * | 7/2009 | Wilkes | G06Q 30/0202 40/543 |
| 2010/0269383 A1 | * | 10/2010 | Nifenecker | H05B 37/00 40/541 |

(Continued)

OTHER PUBLICATIONS

DURISTM E 3 Perfectly homogeneous and highly efficient; OSRAM Opto Semiconductors; www.osram-os.com; May 2011 2 pages.

*Primary Examiner* — Anh Mai
*Assistant Examiner* — Glenn Zimmerman
(74) *Attorney, Agent, or Firm* — Harness, Dickey & Pierce, P.L.C.

(57) ABSTRACT

A solar powered sign assembly includes one or more light sources within a housing. The housing includes first and second sidewalls having inner surfaces and outer surfaces. The outer surfaces define oppositely facing exterior side edge portions of the housing. The light sources are spaced apart from each other such that the light sources extend from top to bottom along the inner surfaces of the first and second sidewalls. One or more light-transmissive signs are attachable to the housing so as to extend across a front and/or back portion of the housing to thereby receive light from the light sources and allow at least some of the light to pass therethrough. One or more solar panels are external to the housing for collecting solar energy for charging one or more batteries. A controller is within the housing and electrically connected to the light sources and the solar panels.

19 Claims, 29 Drawing Sheets

(56) References Cited

U.S. PATENT DOCUMENTS

| | | | |
|---|---|---|---|
| 2011/0030252 A1* | 2/2011 | Marinakis | G09F 7/10 40/549 |
| 2011/0108866 A1* | 5/2011 | Lee | H01L 33/486 257/98 |
| 2011/0252678 A1* | 10/2011 | Jones | E01F 9/00 40/572 |

* cited by examiner

164

Flanged Nylon Spacer

SOLAR POWERED SIGNS INCLUDING SOLAR PANELS AND LIGHT-EMITTING DIODES

CROSS-REFERENCE TO RELATED APPLICATIONS

This application claims priority to U.S. Provisional Patent Application No. 61/706,801 filed Sep. 28, 2012 and to U.S. Provisional Patent Application No. 61/863,304 filed Aug. 7, 2013. The entire disclosures of the above applications are incorporated herein by reference.

FIELD

The present disclosure relates to solar powered signs including solar panels and light emitting diodes (LEDs).

BACKGROUND

This section provides background information related to the present disclosure which is not necessarily prior art.

Homeowners oftentimes place signs in their front yards for a variety of reasons. By way of example, such front yards signs may include a home for sale sign, a sign advertising a contractor's work on the house, a political or campaign sign, etc.

SUMMARY

This section provides a general summary of the disclosure, and is not a comprehensive disclosure of its full scope or all of its features.

Exemplary embodiments are disclosed of solar powered signs having solar panels and light emitting diodes (LEDs). In exemplary embodiments, a battery is charged by solar energy to electrically power the LEDs for lighting a sign or display medium.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is an upper perspective view of a solar powered sign assembly according to an exemplary embodiment, where the sign assembly is shown without a sign or display medium to illustrate the removability of the sign and the interior of the sign assembly including four LED boards mounted to a first LED mount bar along a first inner sidewall of the sign box, housing, or frame and wiring electrically connecting the LEDS boards, which wiring may also be coupled (e.g., via clips and zip ties, etc.) to one or more walls of the housing;

Figure 1:
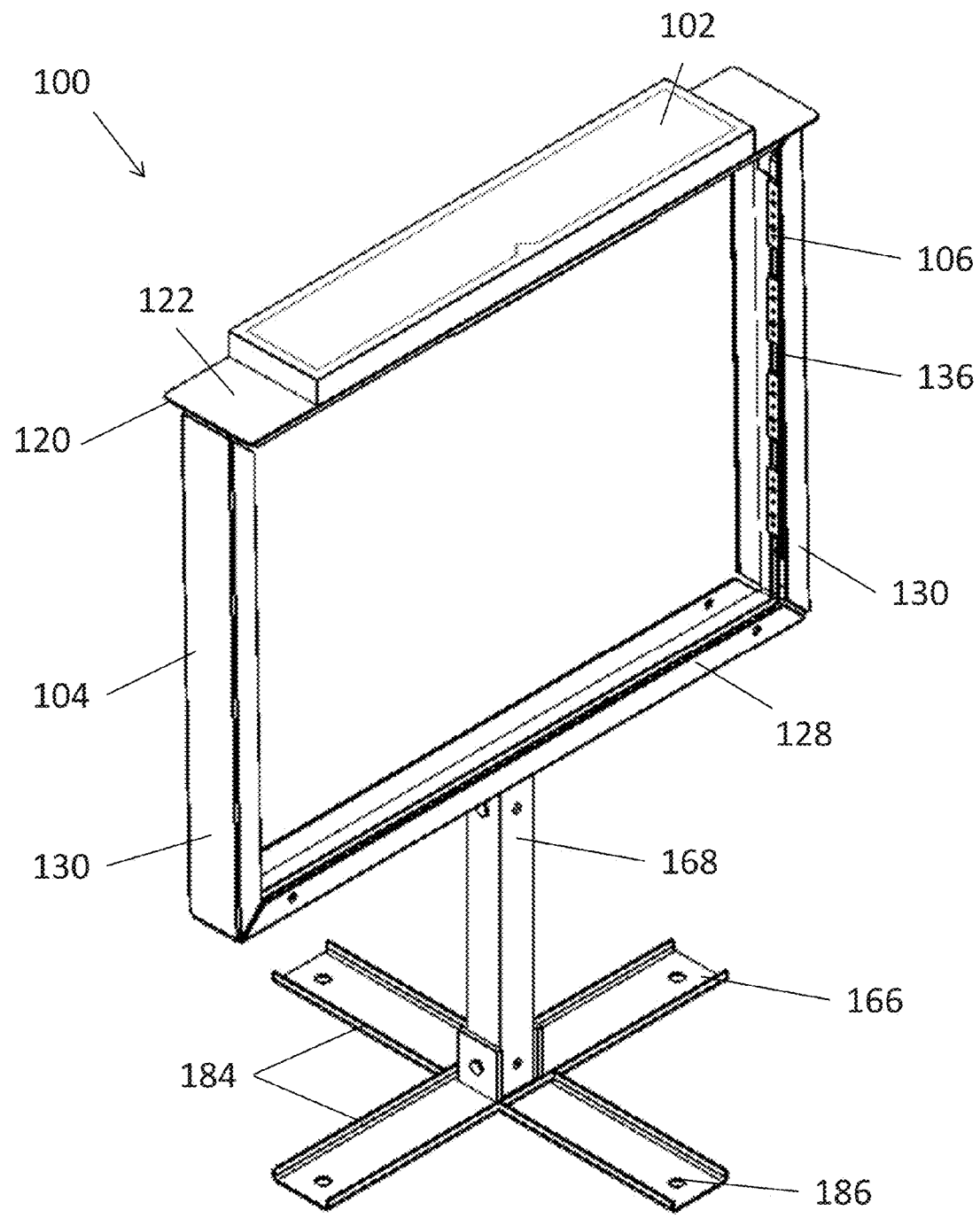
Figure 2:
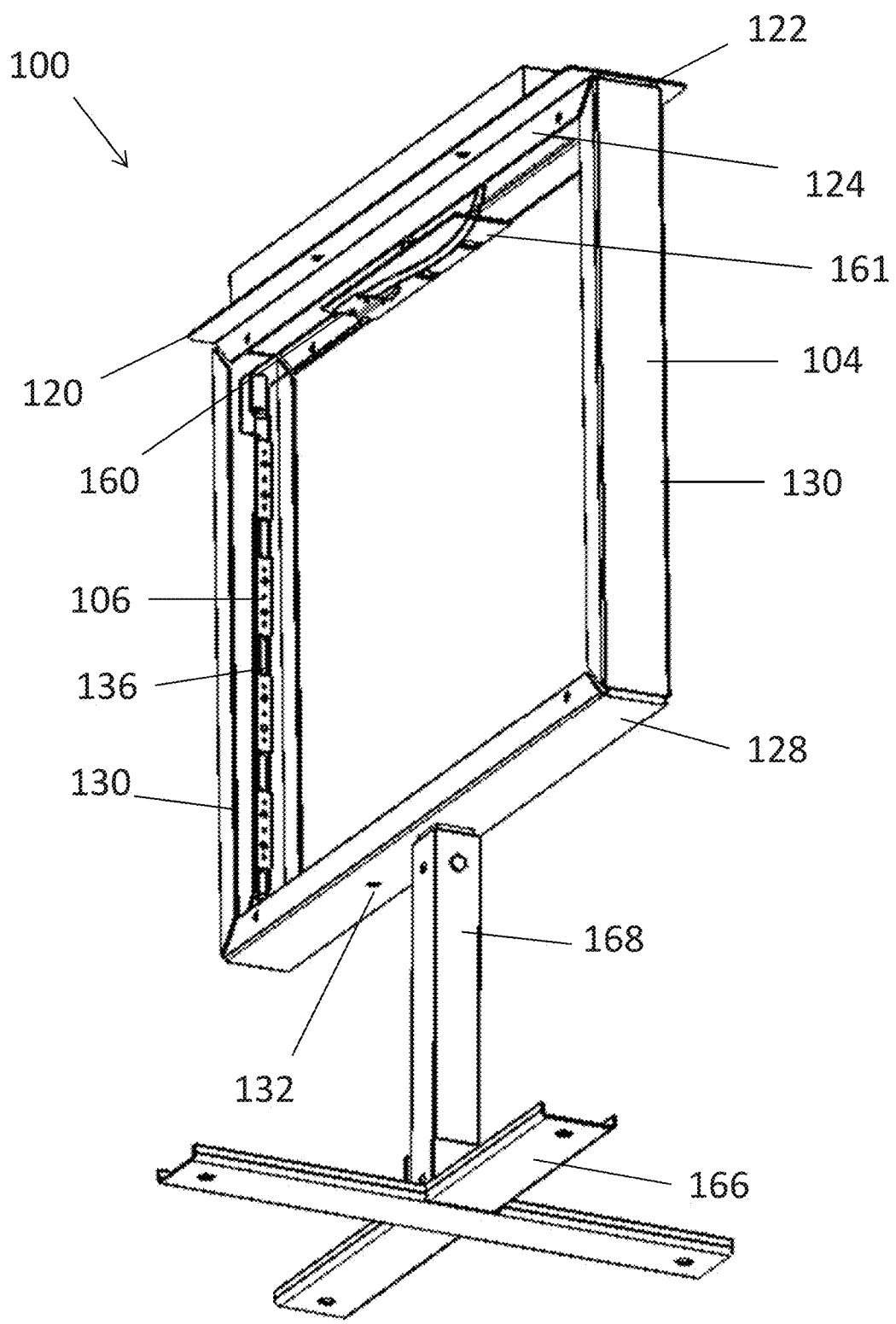
FIG. 2 is a lower perspective view of the sign assembly shown in FIG. 1, and illustrating four LED boards mounted to a second LED mount bar along a second inner sidewall of the housing, a platform for a battery, a solar controller coupled underneath the platform, and wiring electrically connecting the LED boards and solar controller.
Figure 3:
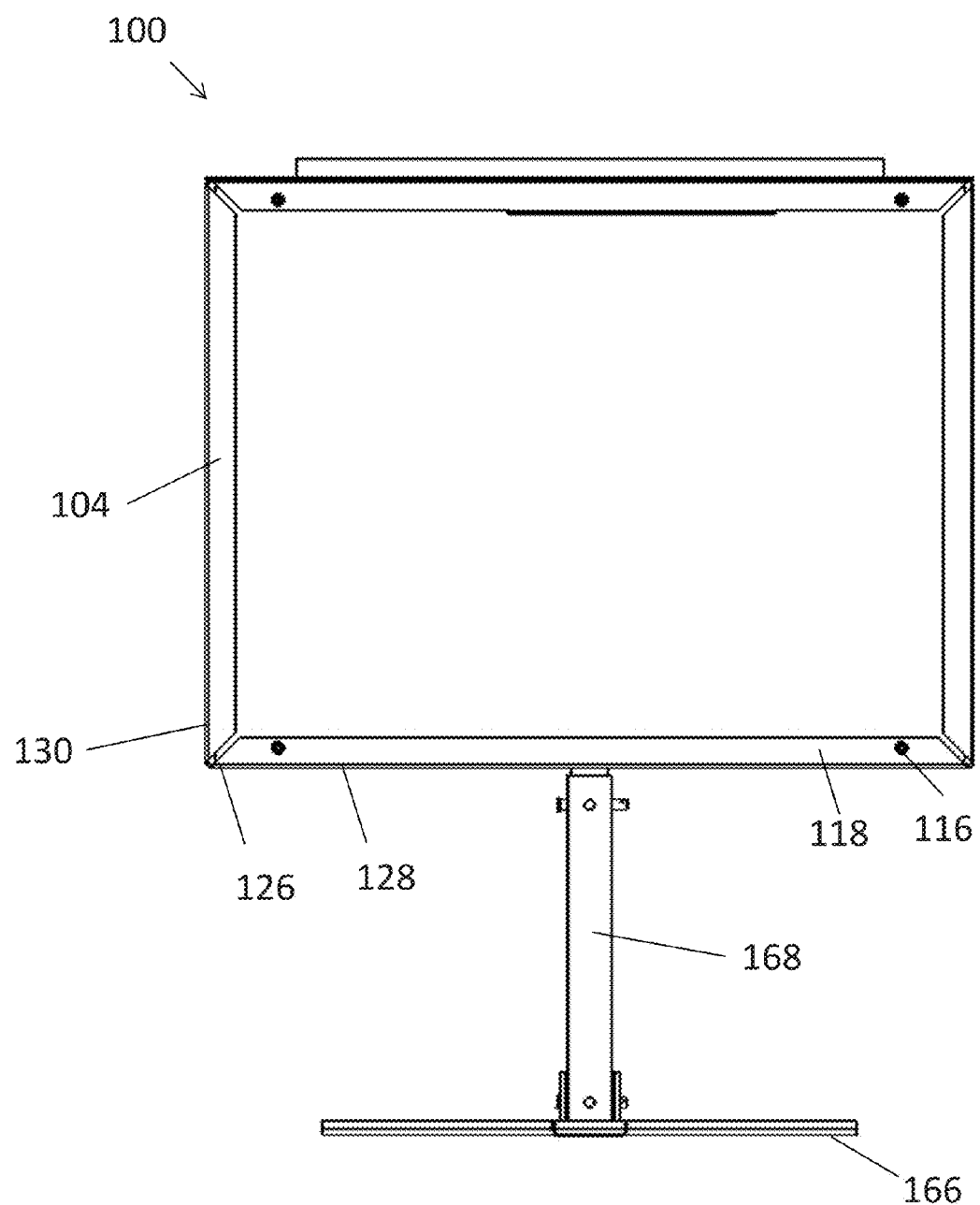
FIG. 3 is a front view of the sign assembly shown in FIG. 1.
Figure 4:
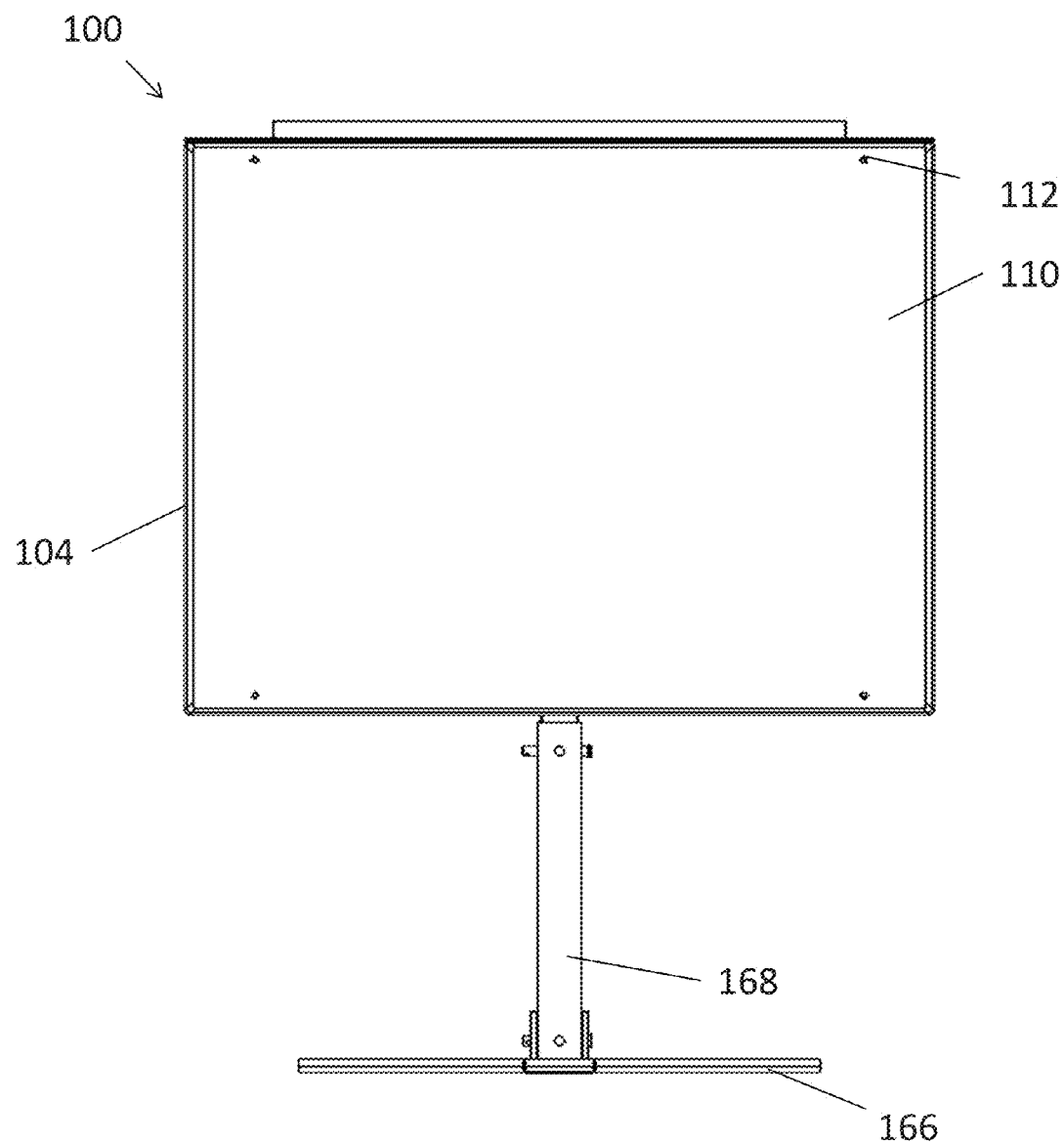
FIG. 4 is a back view of the sign assembly shown in FIG. 1.
Figure 8:
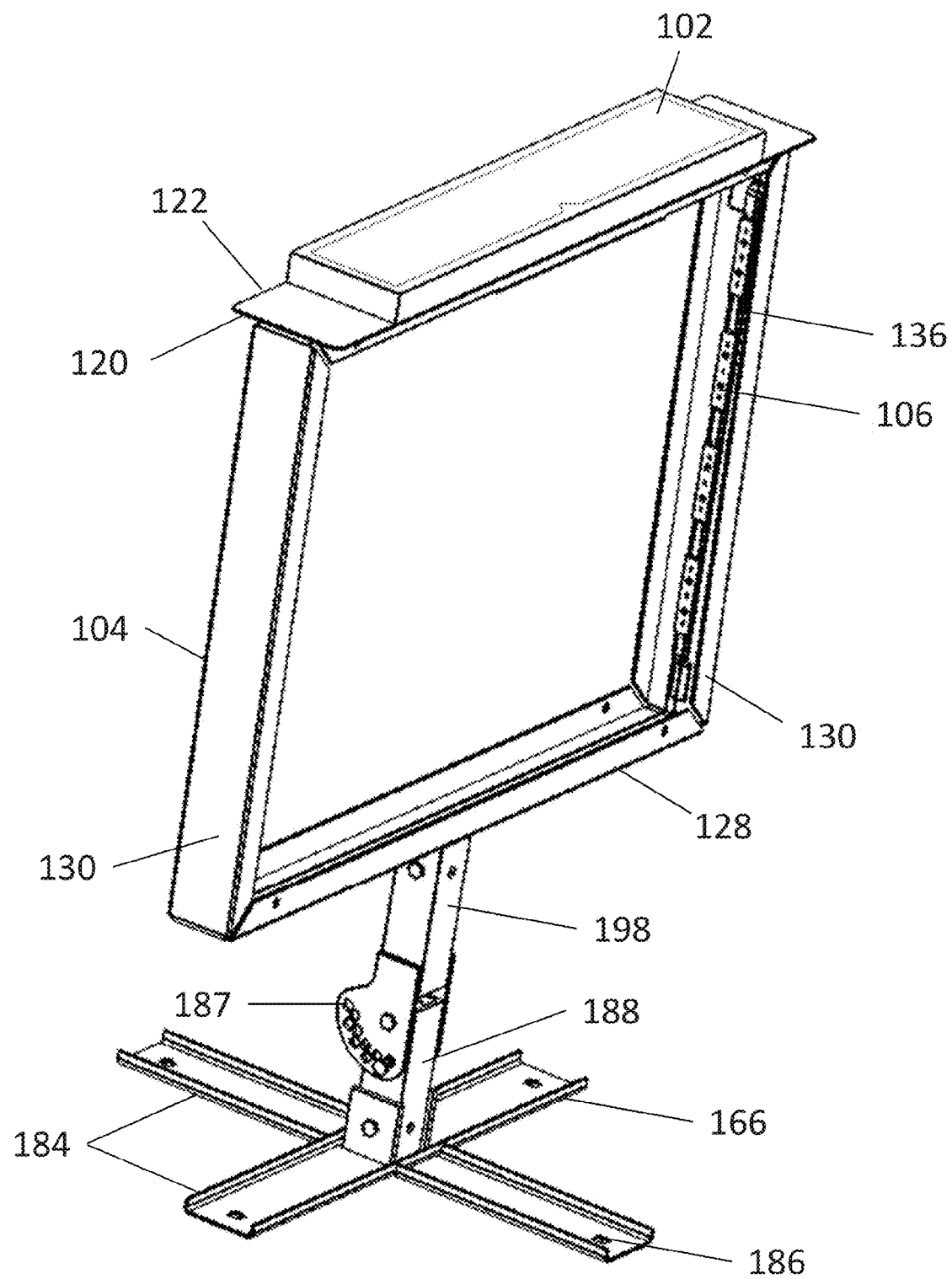
FIG. 8 is an upper perspective view of a solar powered sign assembly according to another exemplary embodiment, where the sign assembly includes a neck pivot retainer that allows adjustment to the angle of the sign or display medium relative to the base.
Figure 12:
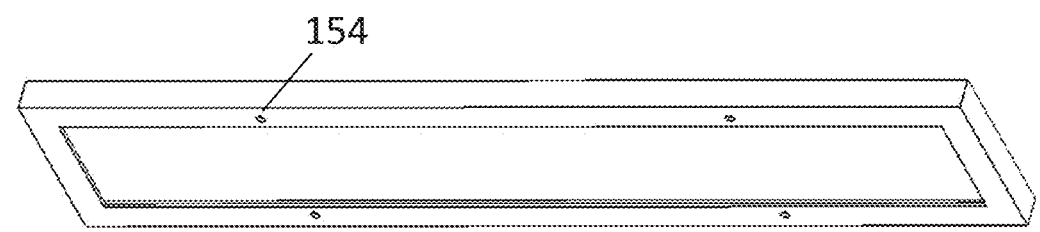
FIG. 12 is a bottom perspective view of the solar panel shown in FIG. 11, and illustrating fastener holes alignable with corresponding fastener holes in the top of the housing (as shown in FIG. 10) for attaching the solar panel to the housing with mechanical fasteners positioned through the aligned fastener holes.
Figure 13:
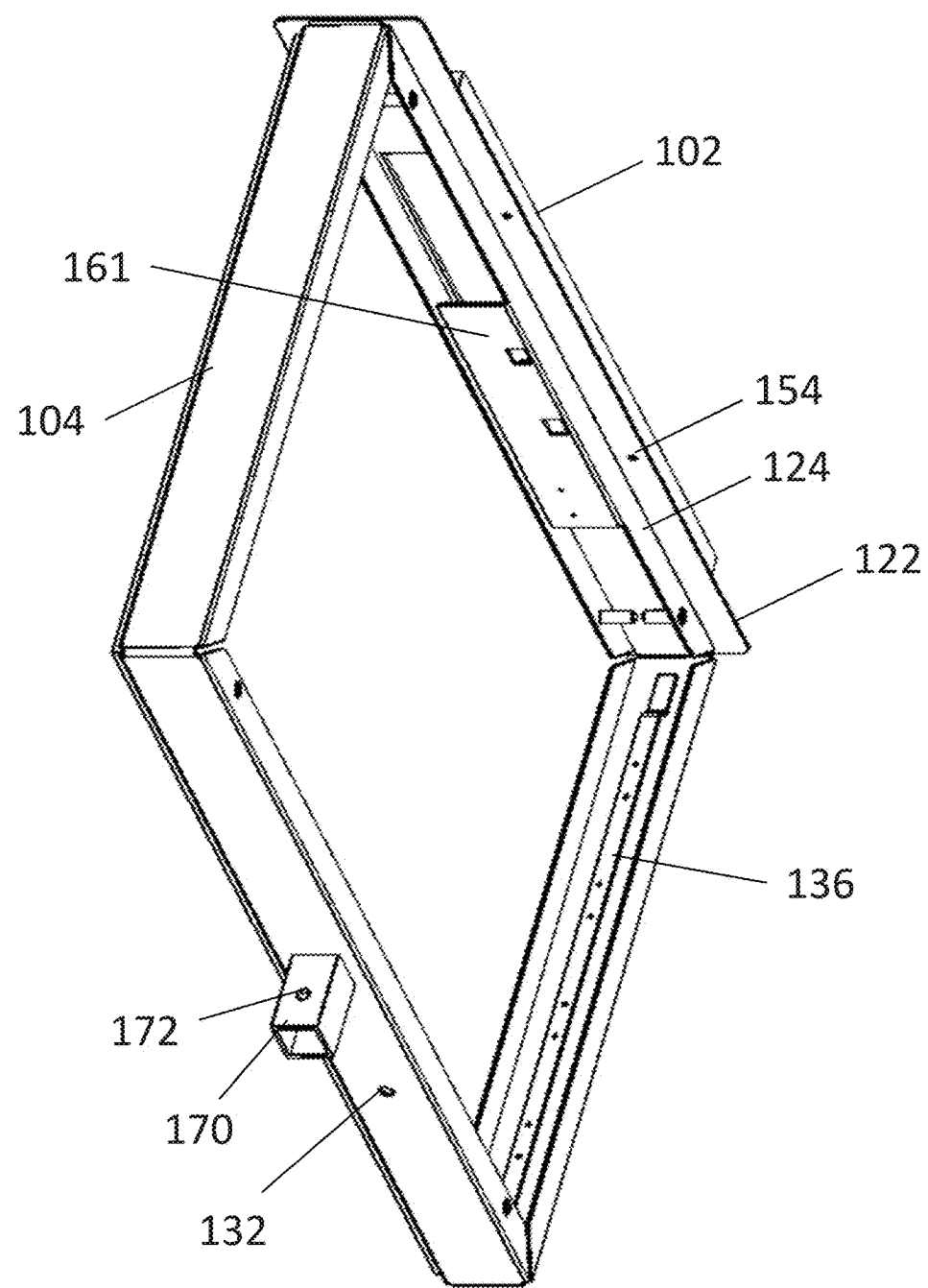
FIG. 13 is a lower perspective view of the housing shown in FIG. 9, and illustrating the first LED mount bar, the support or platform for the solar controller and battery, and mechanical fasteners (e.g., rivet nuts, etc.) for coupling front and/or back signs to the housing.
Figure 17:
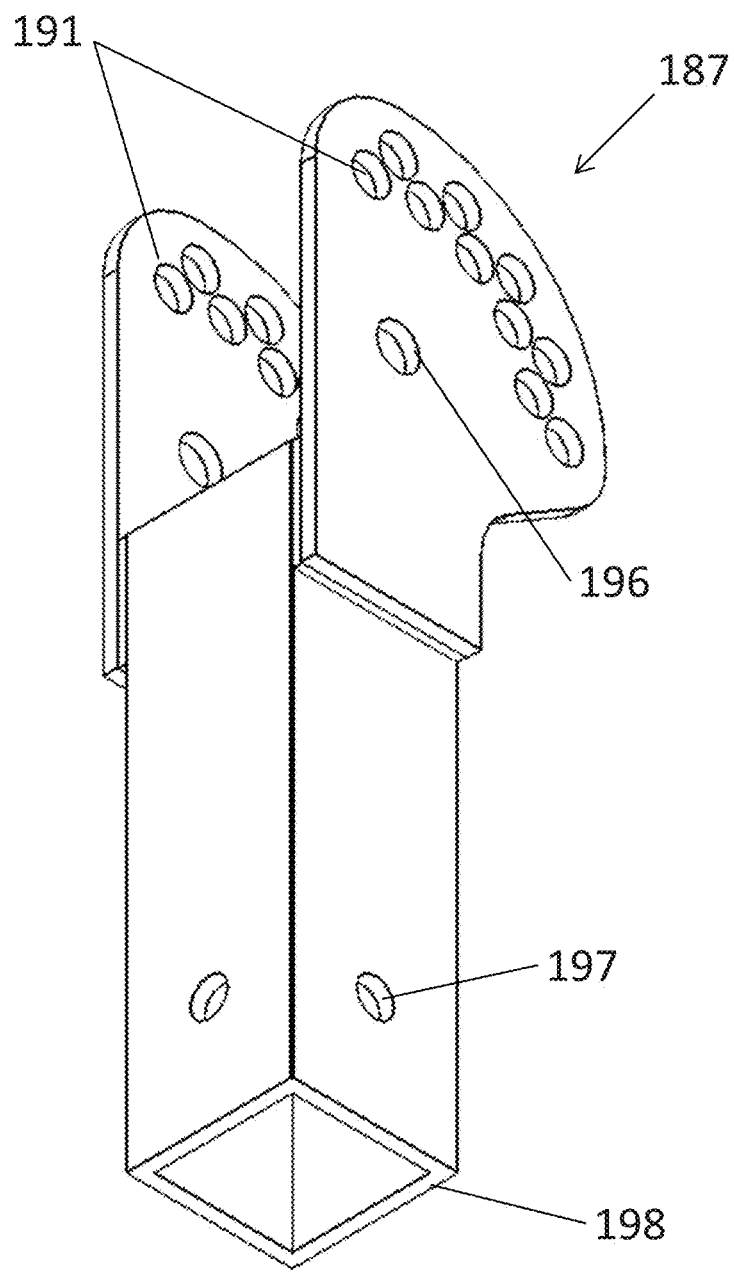
FIG. 17 is a perspective view of a neck pivot retainer that may be used with the sign assembly shown in FIG. 8, where the neck pivot retainer allows adjustment to the angle of the sign or display medium relative to the base.
Figure 18:
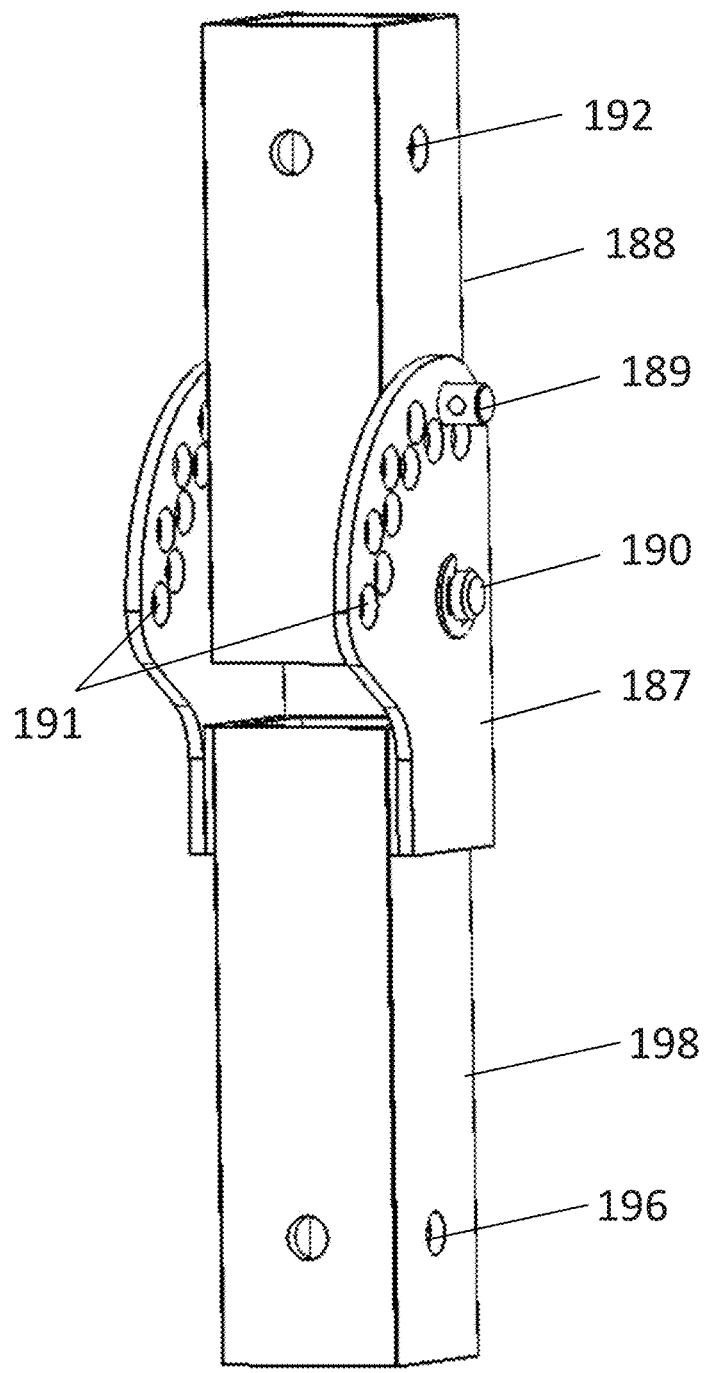
Figure 19:
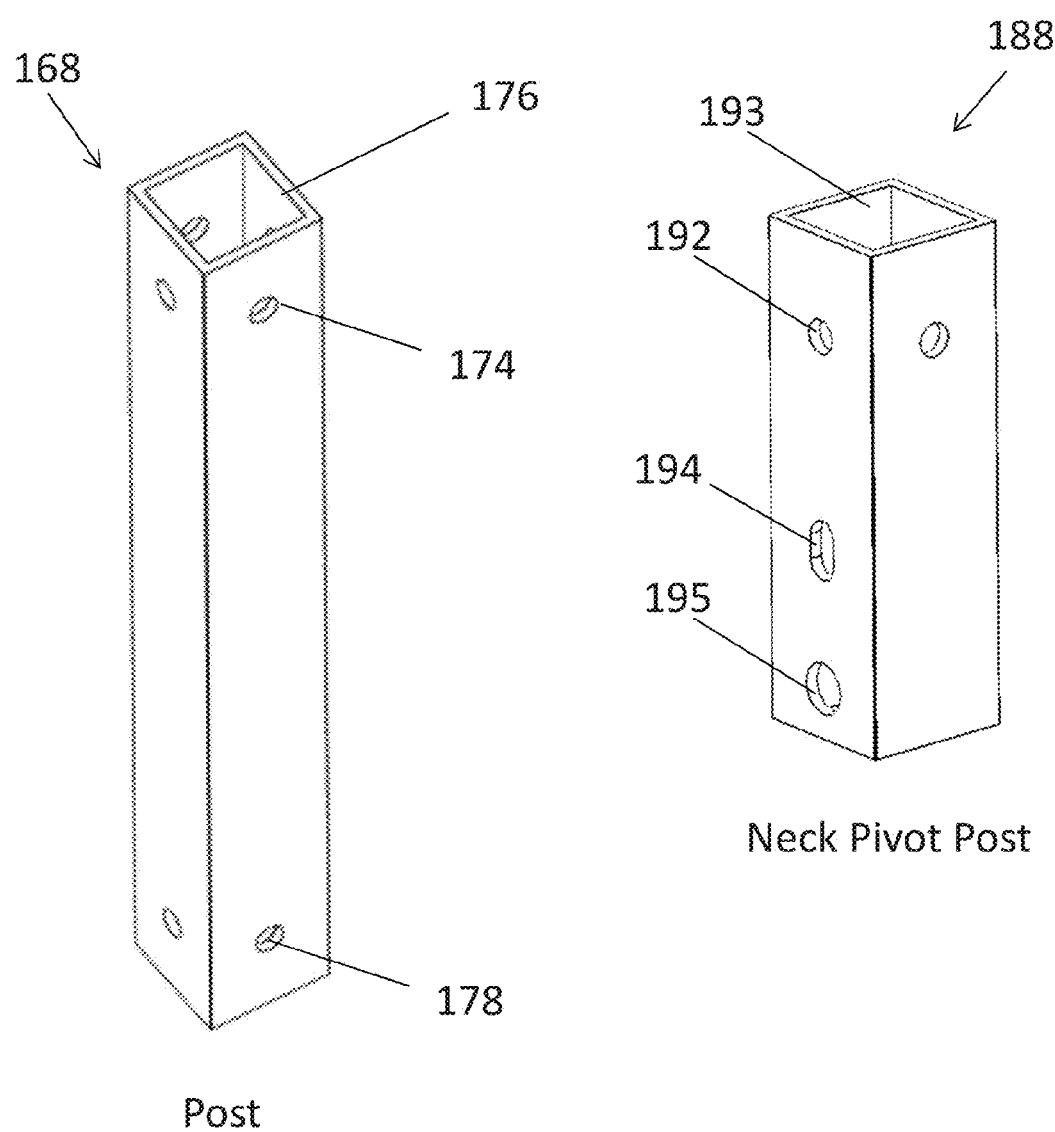
Figure 20:
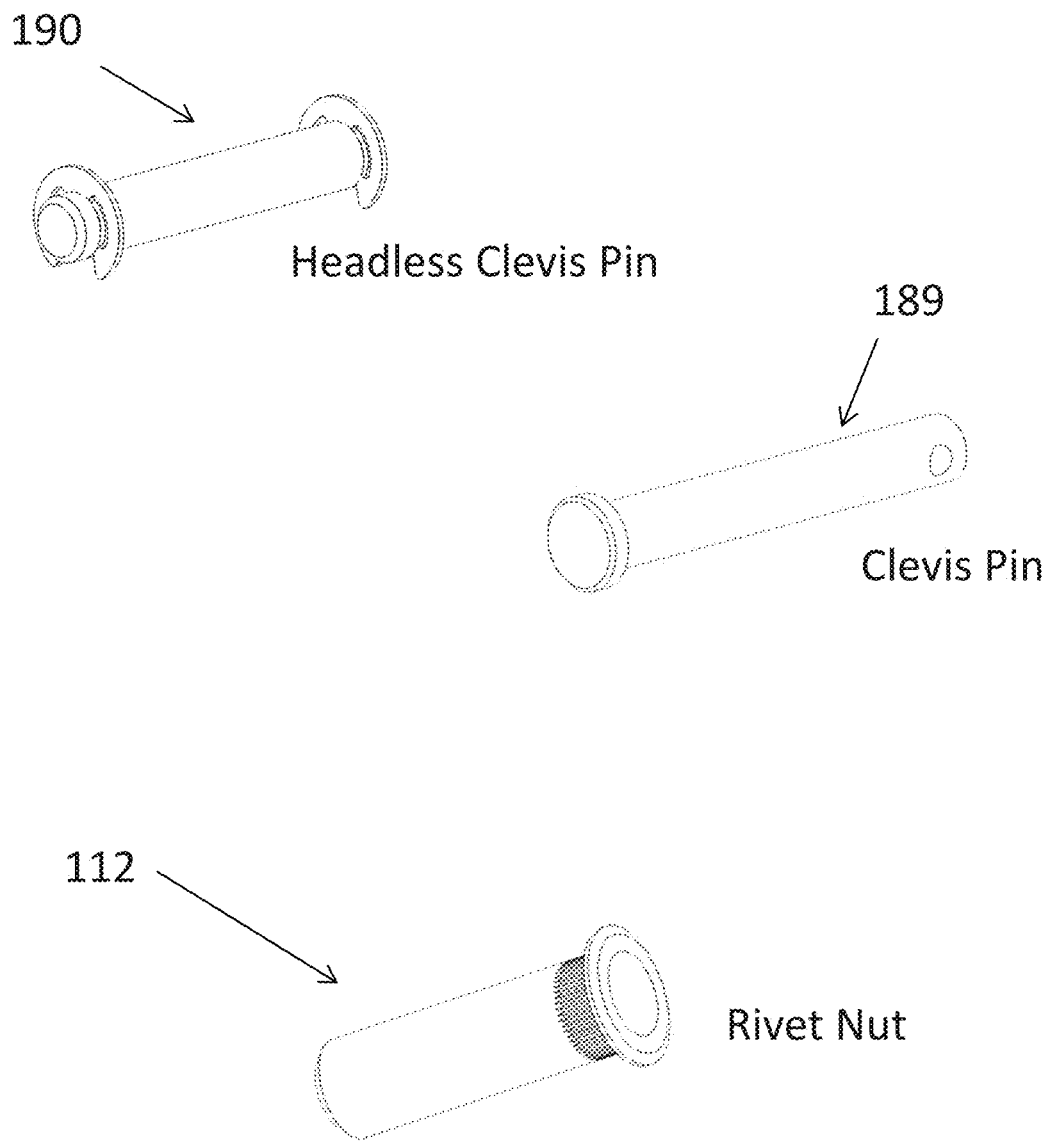
Figure 21:
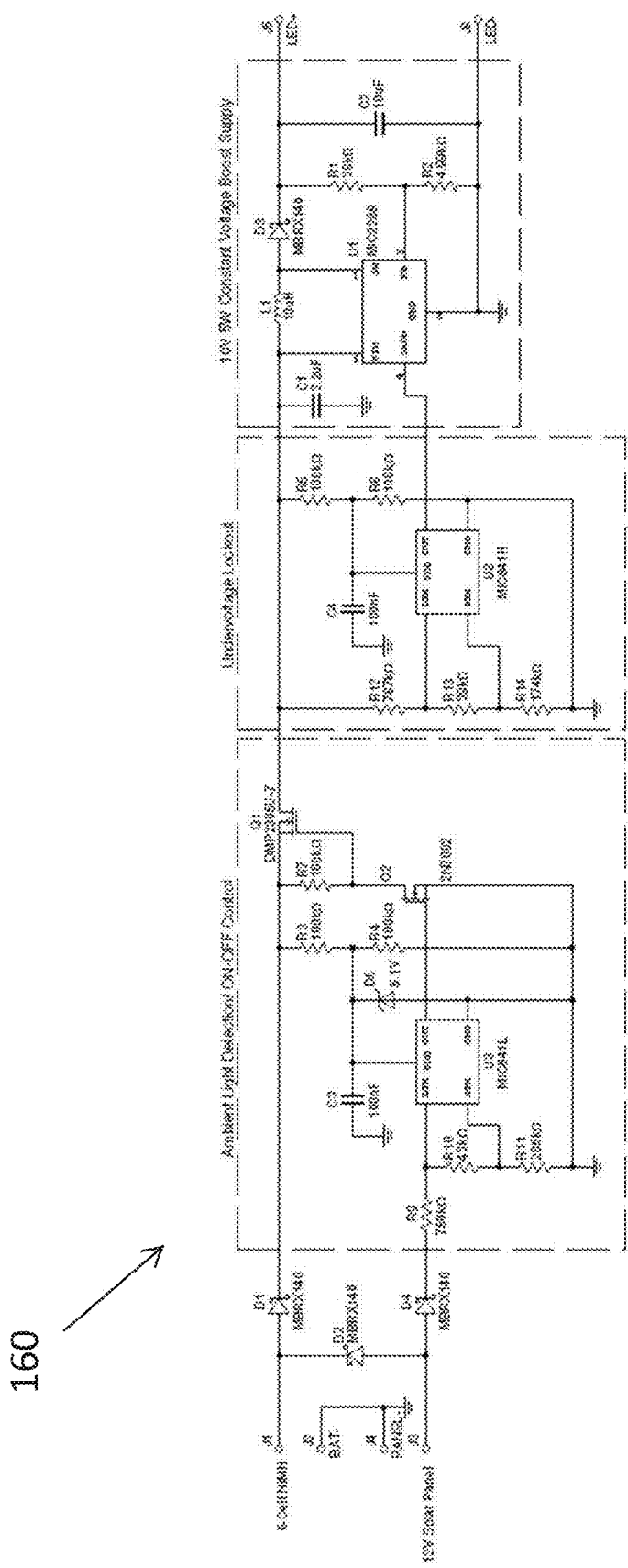
Figure 22:
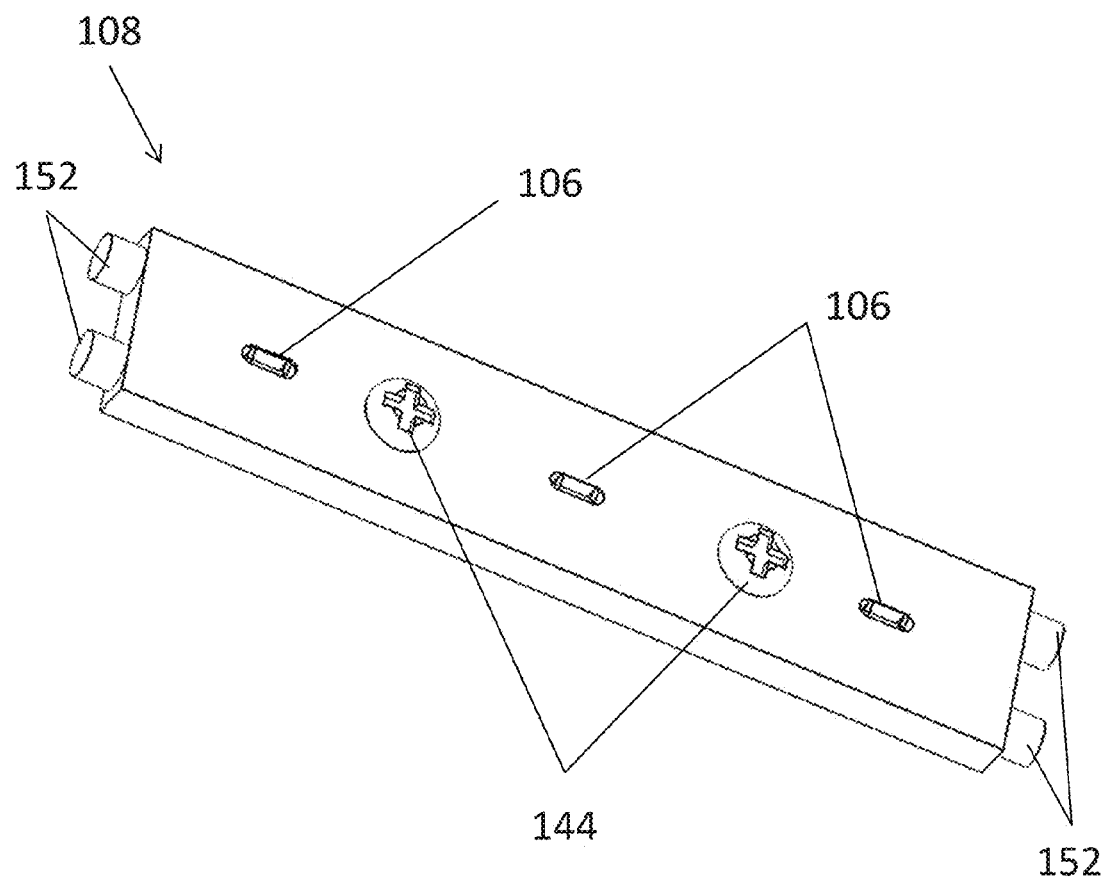
Figure 23:
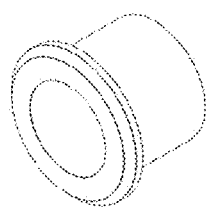
Figure 24:
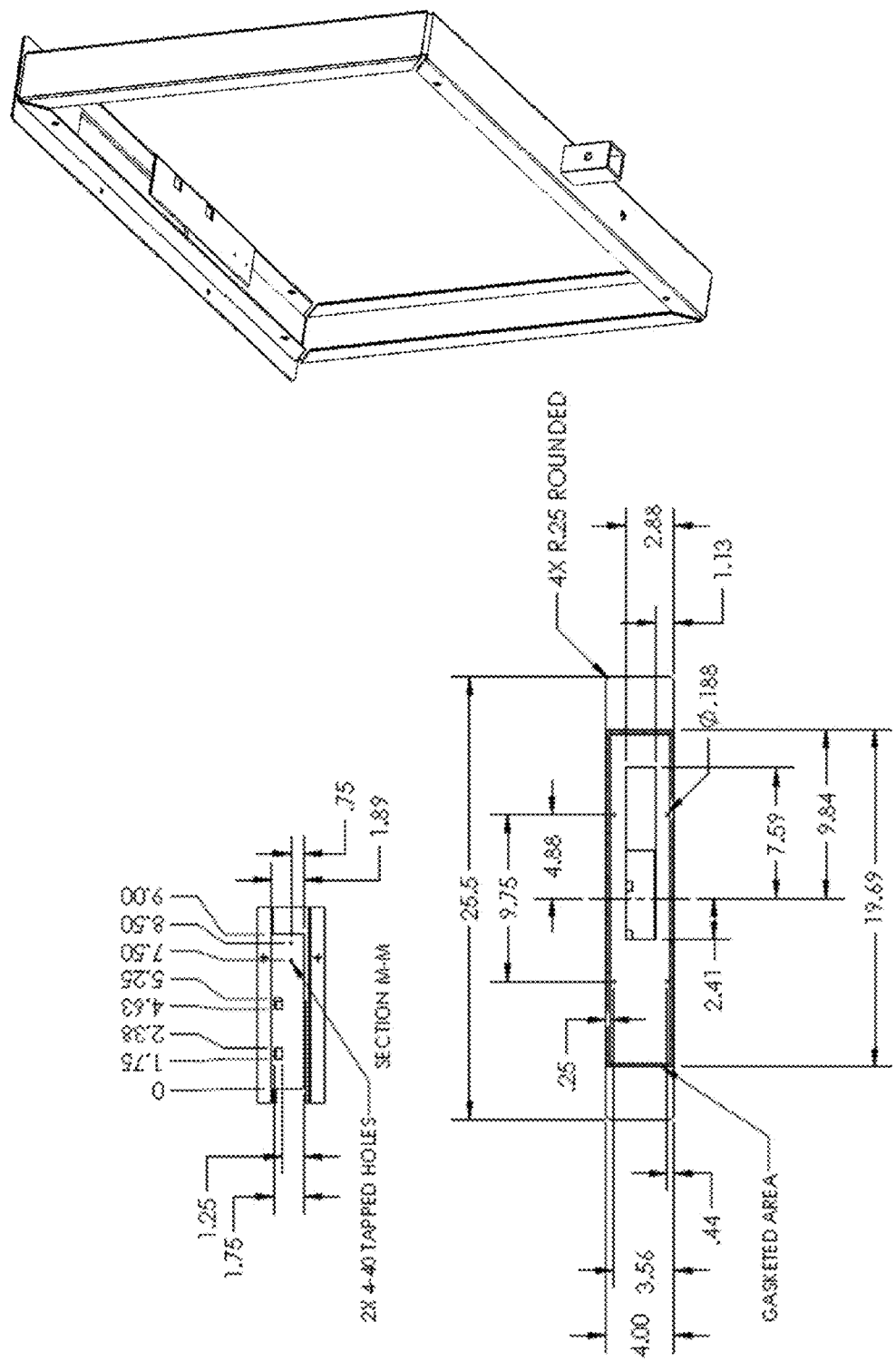
Figure 25:
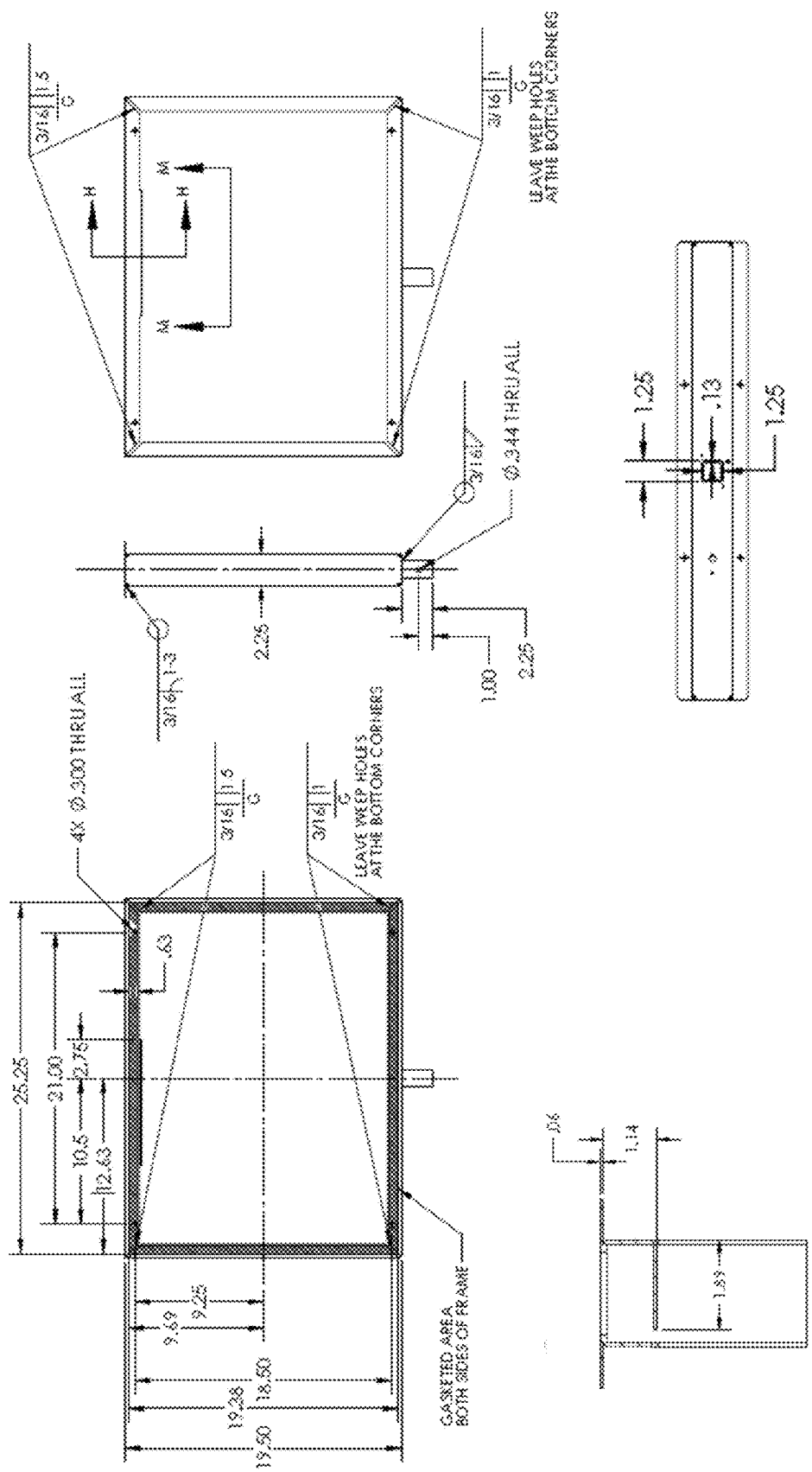
Figure 26:
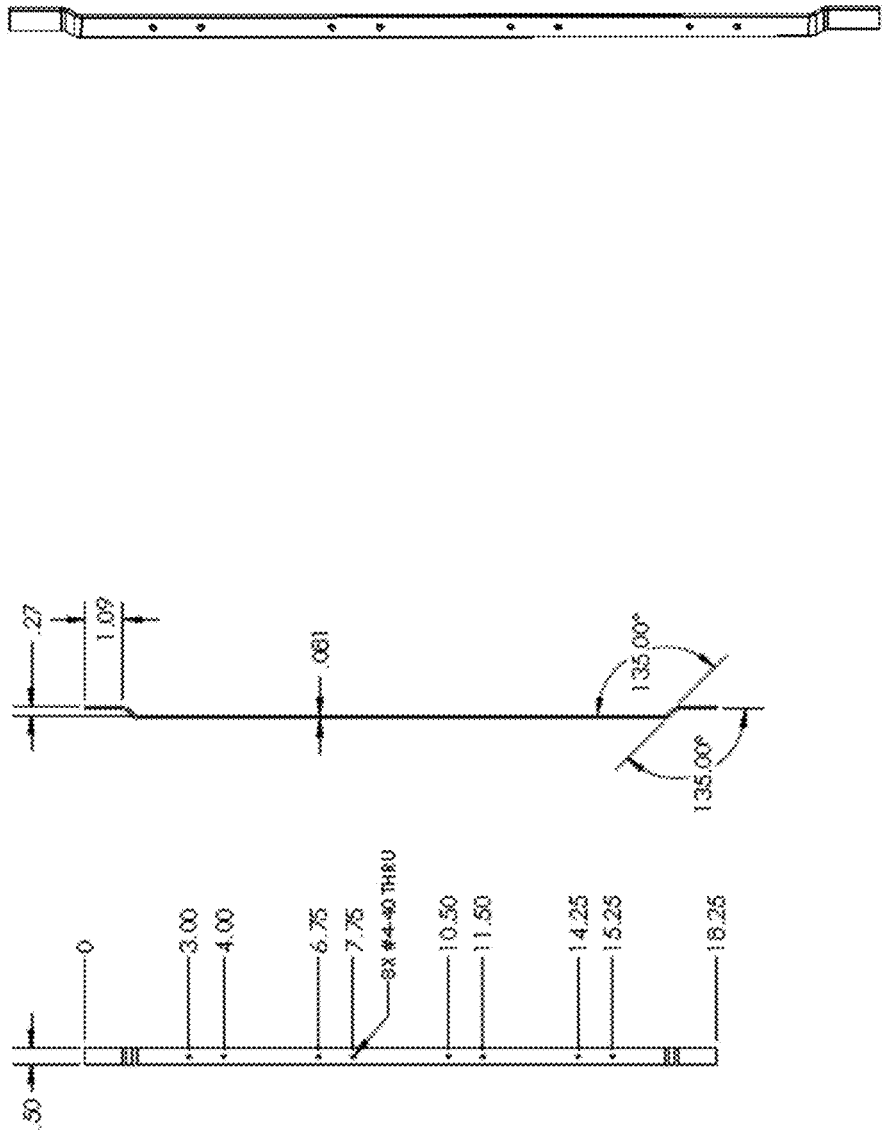
Figure 27:
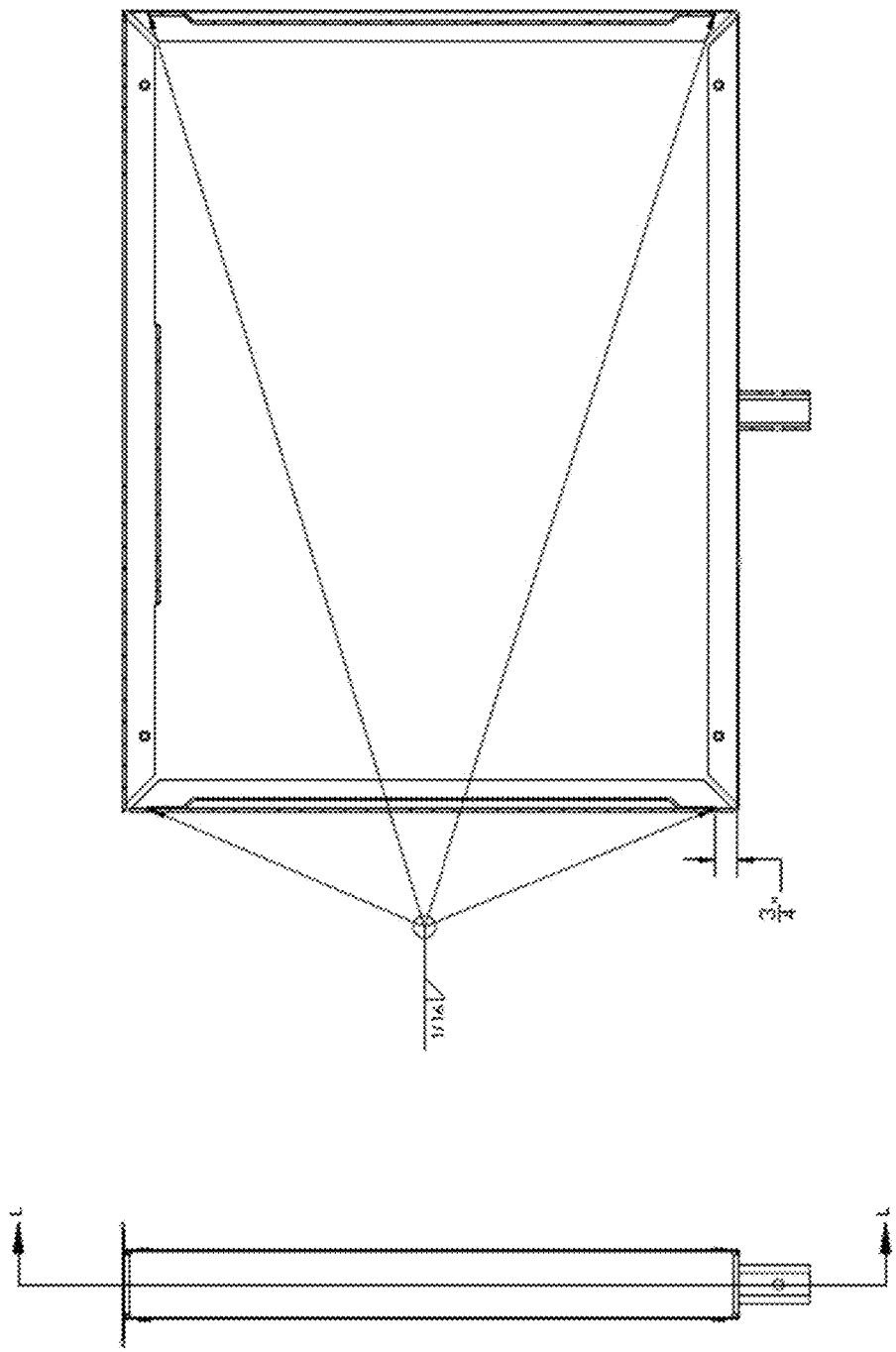
Figure 28:
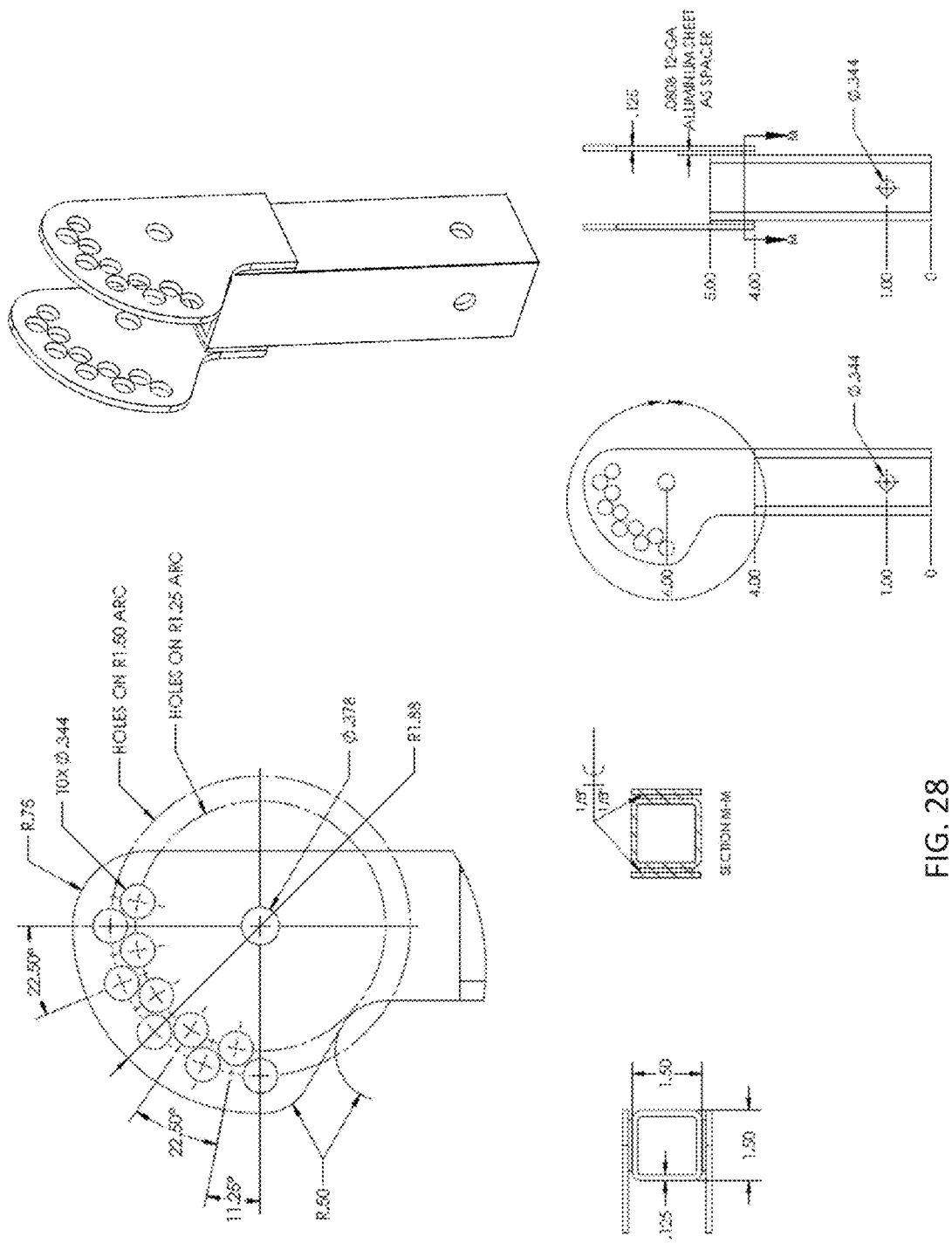
Figure 29:
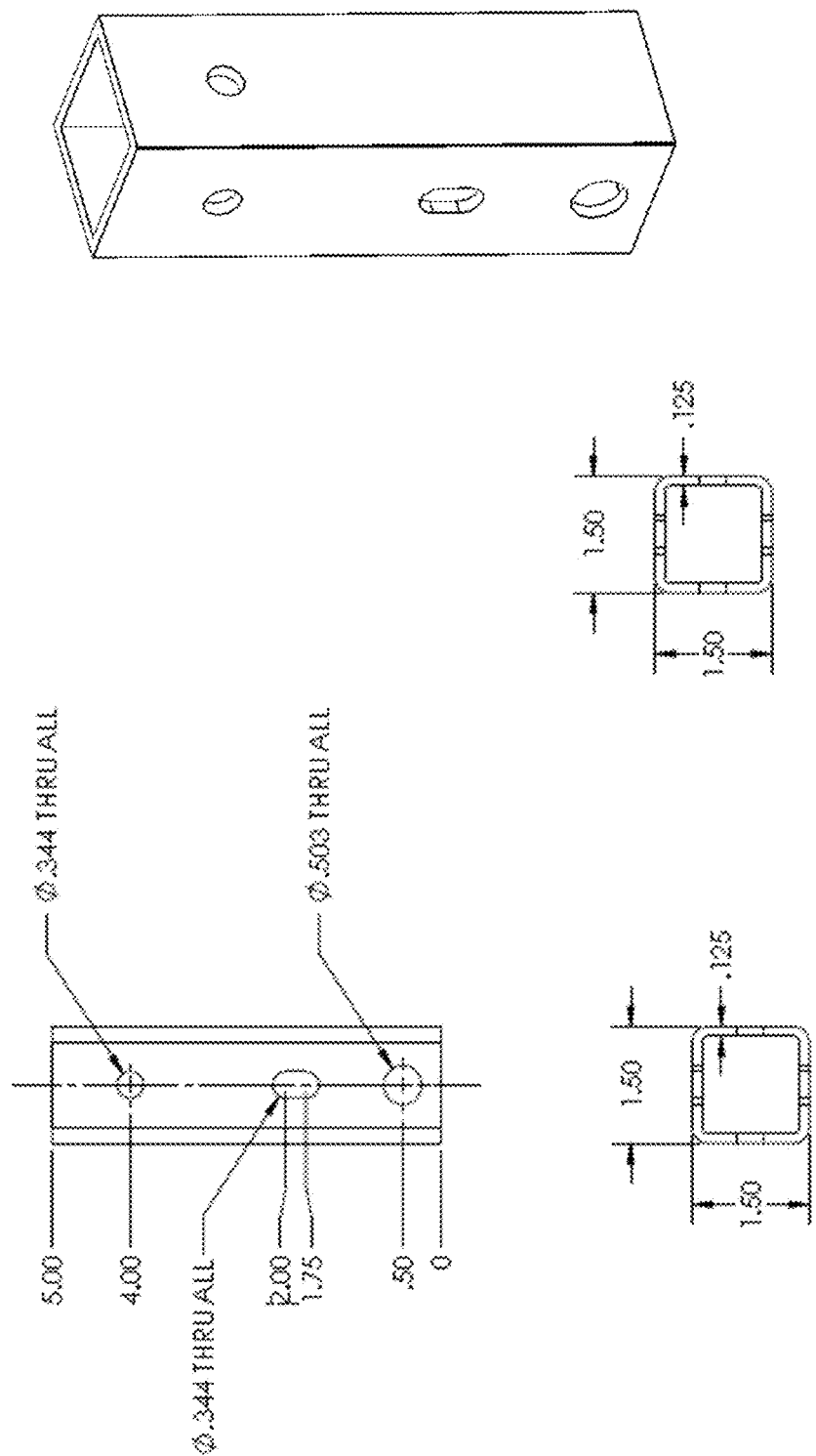
Figure 30:
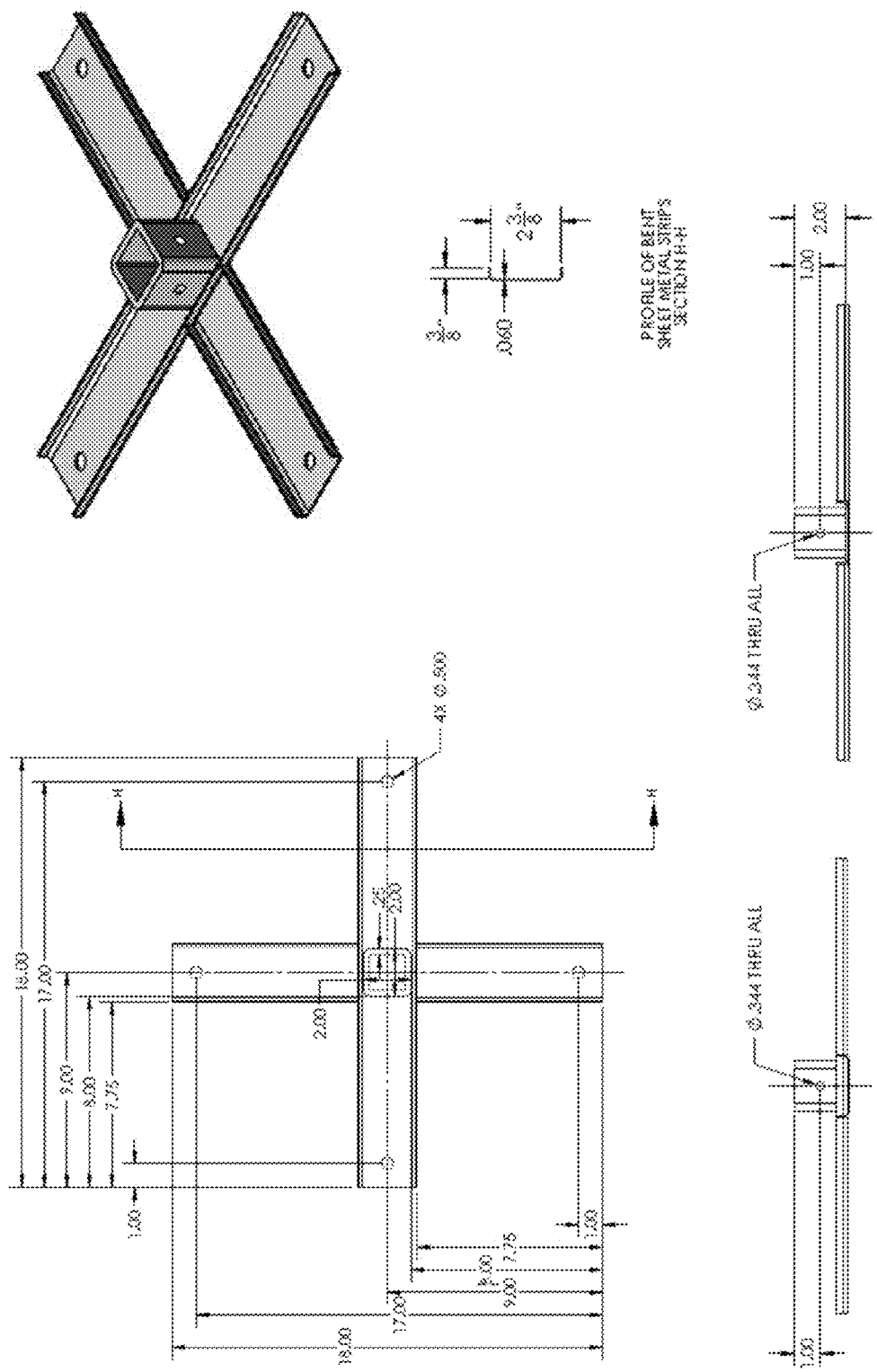
Figure 31:
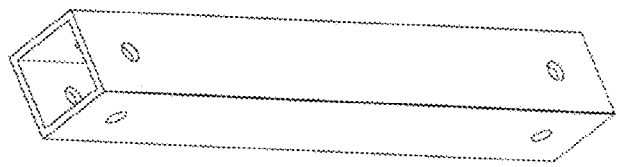
Figure 31:
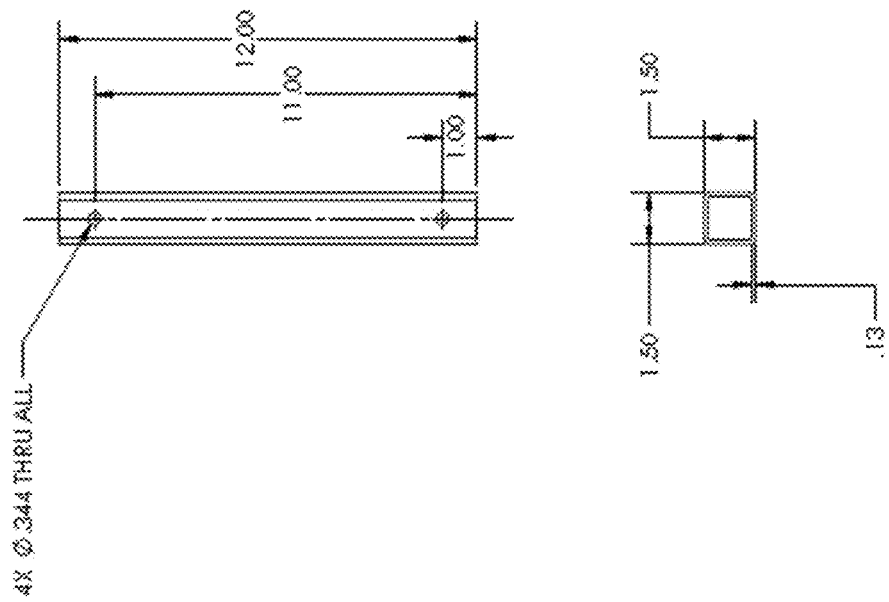

FIG. 18 is a perspective view of the neck pivot retainer shown in FIG. 17 with a neck pivot post coupled thereto by a clevis pin and a headless clevis pin with retaining rings, where the neck pivot post may be coupled to the housing and the neck pivot retainer may be coupled to the neck post of the sign assembly shown in FIG. 8, whereby the angle of the sign may be adjusted by removing the clevis pin and inserting it through a different set of aligned holes in the neck pivot retainer;

FIG. 19 includes perspective views of the sign post shown in FIG. 1 and the neck pivot post shown in FIG. 18;

FIG. 20 includes perspective views of the headless clevis pin, retaining rings thereon, and the clevis pin that are used to couple the neck pivot post (FIG. 18) to the neck pivot retainer as shown in FIG. 17 and an example rivet nut that may be used for coupling a sign board (FIG. 13) to the housing (FIG. 12);

FIG. 21 illustrates an exemplary solar controller or control board that may be mechanically fastened (e.g., via screws in fastener holes, etc.) to the bottom of the support or platform located towards the top of the housing in FIG. 2, where the solar controller may be electrically connected to the solar panel and a battery positioned on top of the support or platform;

FIG. 22 illustrates an example of one of the eight LED boards that may be mounted (e.g., mechanically fastened, etc.) to the LED mount bars along the inner sidewalls of the sign assembly shown in FIGS. 1 and 2;

FIG. 23 is a perspective view of a dielectric spacer (e.g., flanged nylon spacer, etc.) that may be disposed behind or underneath a board (e.g., solar control board shown in FIG. 21, LED board shown in FIG. 22, etc.) to prevent direct electrical contact and grounding with the electrically-conductive (e.g., metal, etc.) housing of the sign assembly;

FIGS. 24 and 25 show an example sign box, housing, or frame that may be used with a solar powered sign assembly, where exemplary dimensions in inches are provided for purpose of illustration only according to an exemplary embodiment;

FIG. 26 shows an LED mount bar and weldment that may be used with a solar powered sign assembly, where exemplary dimensions in inches are provided for purpose of illustration only according to an exemplary embodiment;

FIG. 27 shows two LED mount bars (FIG. 26) along the inner sidewalls of the housing (FIGS. 24 and 25), where exemplary dimensions in inches are provided for purpose of illustration only according to an exemplary embodiment;

FIG. 28 shows a neck pivot retainer that may be used with a solar powered sign assembly, where exemplary dimensions in inches are provided for purpose of illustration only according to an exemplary embodiment;

FIG. 29 shows a neck pivot post that may be used with a solar powered sign assembly, where exemplary dimensions in inches are provided for purpose of illustration only according to an exemplary embodiment;

FIG. 30 shows a base that may be used with a solar powered sign assembly, where exemplary dimensions in inches are provided for purpose of illustration only according to an exemplary embodiment; and FIG. 31 shows a post that may be used with a solar powered sign assembly, where exemplary dimensions in inches are provided for purpose of illustration only according to an exemplary embodiment.

Corresponding reference numerals indicate corresponding parts throughout the several views of the drawings.

DETAILED DESCRIPTION

Example embodiments will now be described more fully with reference to the accompanying drawings.

Exemplary embodiments are disclosed of solar powered sign assemblies or apparatus having solar panels and light emitting diodes (LEDs) for lighting a display medium of the sign. In exemplary embodiments, a battery is charged by solar energy to electrically power the LEDs for lighting a sign or display medium.

In an exemplary embodiment, the sign assembly may be configured for use with one or more removable (e.g., mechanically fastened, snapped onto, etc.) and/or interchangeable signs or display mediums. For example, an existing front and/or back sign or display medium (e.g., polystyrene or vinyl sign, etc.) may be readily removed (e.g., unsnapped, unscrewed, unfastened, etc.) from a housing, frame, enclosure, or box of the sign assembly. Then, a substitute or different display medium or sign may be readily coupled to (e.g., screwed onto, snapped onto, mechanically fastened, etc.) the housing of the sign assembly. Accordingly, this allows the sign assembly to be easily customized or tailored for a particular situation in a relatively easy and inexpensive way by simply exchanging one sign or display medium for another. Exemplary embodiments disclosed herein provide a versatile solar powered sign assembly that is charged and powered with sunlight and that have LEDs (or other suitable light sources) that will light up the sign (e.g., provide back lighting and/or edge lighting of the sign, etc.) in an exceptionally bright manner especially at night where the typical yard sign is not visible.

FIGS. 1 through 7 illustrate an exemplary embodiment of a solar powered sign assembly 100 embodying one or more aspects of the present disclosure. As disclosed herein, the sign assembly 100 includes a solar panel 102 along a top of a housing, frame, enclosure, or box 104 of the sign assembly 100. The solar panel 102 is operable for charging a battery, which, in turn, provides electrical power for operating light emitting diodes (LEDs) 106 (e.g., LEDs 106 on an LED board 108 shown in FIG. 22, etc.). A display medium or sign 110 (e.g., polystyrene or vinyl picture, sign board, etc.) may be coupled to the front and/or back of the sign assembly 100, which sign 110 would then be lit up (e.g., backlit and/or edgelit, etc.) by the light from the LEDs 106 within the housing 104. Accordingly, this exemplary embodiment is a self-contained, standalone solar powered sign assembly that is independently operable, e.g., without having to be plugged into an electrical wall outlet, etc.

Figure 9:
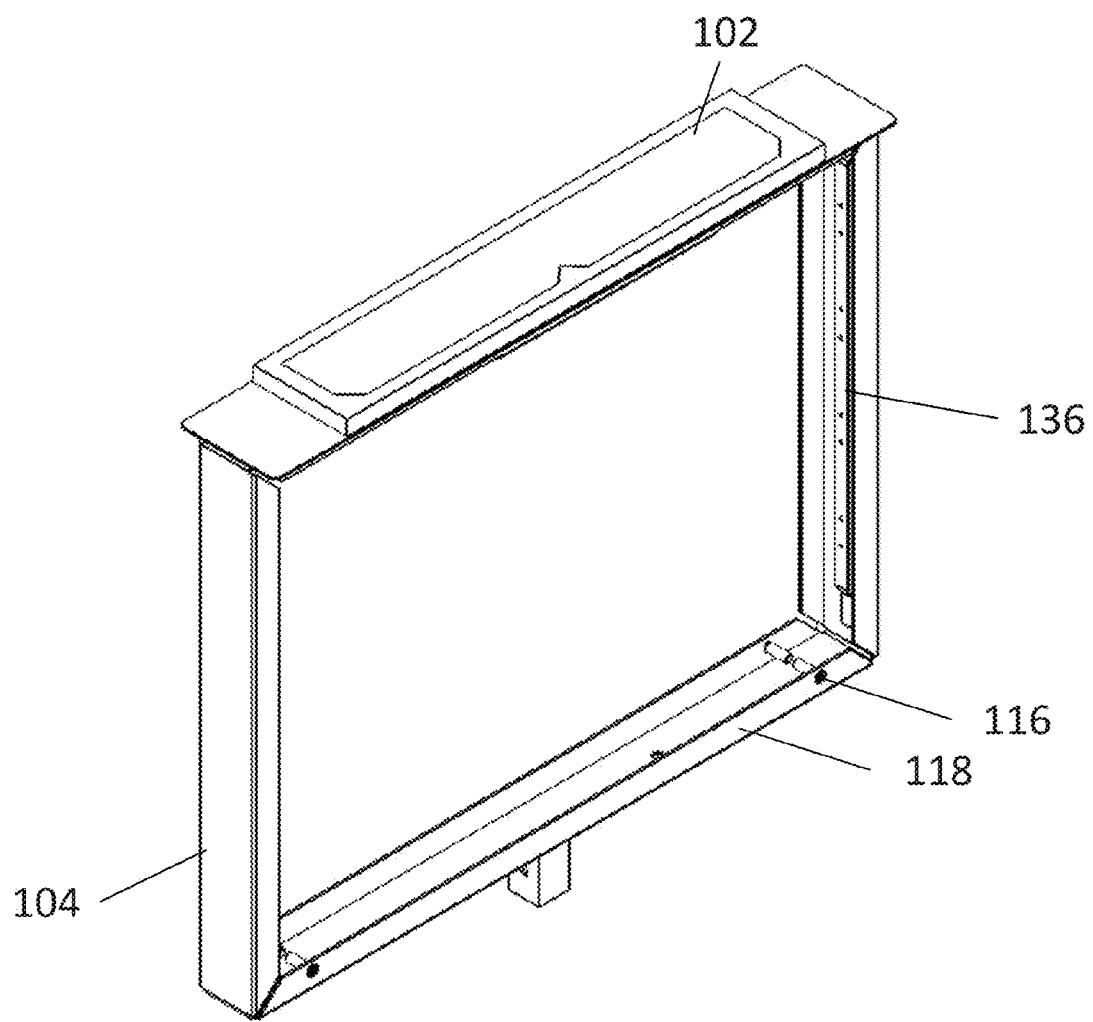
FIG. 9 is an upper perspective view of the housing or frame of the sign assembly shown in FIG. 1 and FIG. 8.
Figure 14:
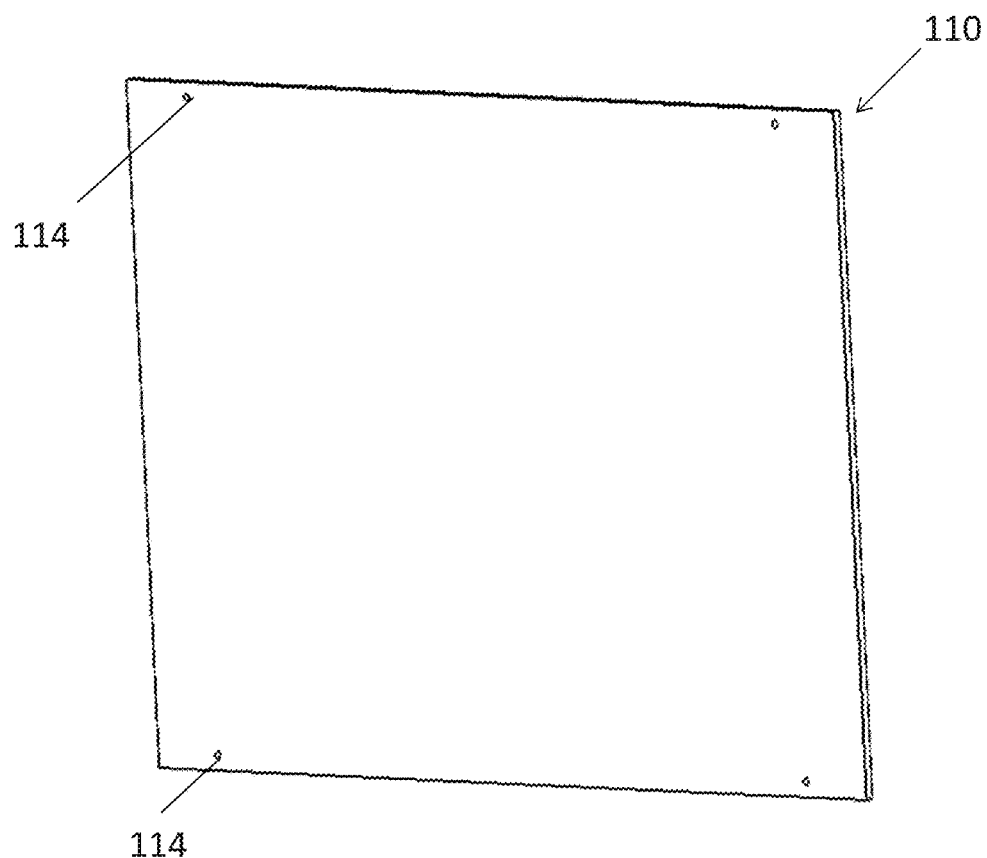
FIG. 14 is a perspective view of an exemplary sign board that may be coupled to the housing shown in FIG. 13, where the sign board includes fastener holes alignable with corresponding fastener holes in the housing for attaching the sign board to the housing with mechanical fasteners positioned through the aligned fastener holes.

In an exemplary embodiment, front and back signs or display mediums 110 (e.g., sign board 110 in FIGS. 4 and 14, etc.) are removably attachable to the housing 104 via mechanical fasteners 112 (e.g., 10-32 rivet nuts shown in FIG. 20, etc.). For example, mechanical fasteners 112 are inserted into fastener holes 114 (FIG. 8) in the sign board 110 (FIG. 8) and fastener holes 116 in perimeter flanges 118 of the housing 104 (FIG. 9). In alternative embodiments, other means and methods (e.g., snaps, magnets, hook and loop fasteners, etc.) may be used for removably attaching front and/or back signs or display mediums to a sign assembly.

After being coupled to the housing or sign box 104, the signs 110 (e.g., polystyrene or vinyl picture, etc.) may then be lit (e.g., backlit and/or edgelit, etc.) by the LEDs 106 (or other suitable light source) inside the housing 104. The inventors' design is unique at least because it allows a user to easily change out the sign configuration based on the user's preferences or requests. The inventors' design allows different signs or display mediums to be used with the same frame or housing assembly. For example, the user may obtain a 25 inch by 19 inch custom sign ad and attach it to the frame. The sign assembly would then be charged and powered with sunlight. The LEDs would light up the sign in an exceptionally bright manner, which will provide (e.g., homeowner, etc.) an exposure unlike any typical yard sign especially at night where the typical yard sign is not visible. Later, the user may switch out the signs, e.g., to convey a different message for a different event, etc.

The front and/or back signs or display mediums may be made from suitable materials, which are preferably not opaque (e.g., light-transmissive, translucent, etc.) and preferably will allow at least some light from LEDs 106 inside the housing 104 to pass through the signs for backlighting purposes. In an exemplary embodiment, the front and/or back signs are made from polystyrene and may have artwork, images, designs, etc. added by a commercial printer. Alternatively, the signs or display mediums may be made from other suitable materials such as vinyl, etc.

The front and/or back signs are preferably made out of a suitable material that is at least partially water resistant or water proof. In which case, the front and/or back signs when attached to the housing 104 help prevent water (e.g., rain water, water from a yard sprinkler, etc.) from entering the interior of the housing 104 and possibly damaging the electronics. The sign assembly 100 may also include one or more drip edges attached to or integrally defined by the housing 104 to help prevent water from entering the interior of the housing 104. For example, the drip edges may be provided by attaching (e.g., soldering, etc.) one or more separate pieces to the housing 104. Or, for example, the housing 104 may include an oversized top portion that integrally defines drip edges. Some exemplary embodiments may include a solar panel wide enough to cover the front and back signs attached to the housing. In such exemplary embodiments, the signs may comprise print materials that are water resistant and secured to the housing in such a way that the top edges of the prints are sheltered by the solar panel or the base supporting the solar panel. A sealing material (e.g., adhesive, etc.) may be applied around a perimeter of the print material of the signs to avoid or inhibit water seepage into an interior of the housing.

Figure 5:
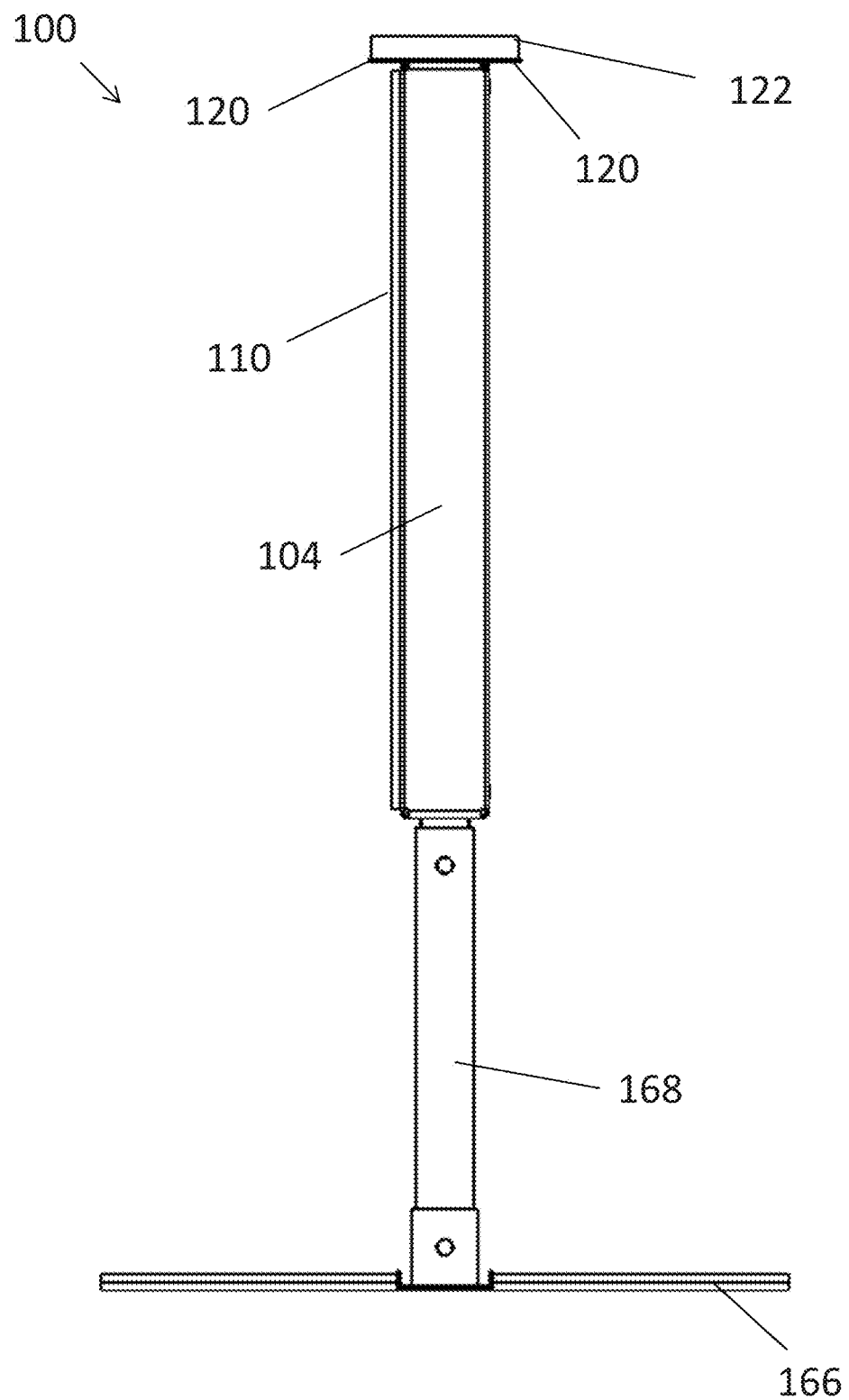
FIG. 5 is a side view of the sign assembly shown in FIG. 1.
Figure 6:
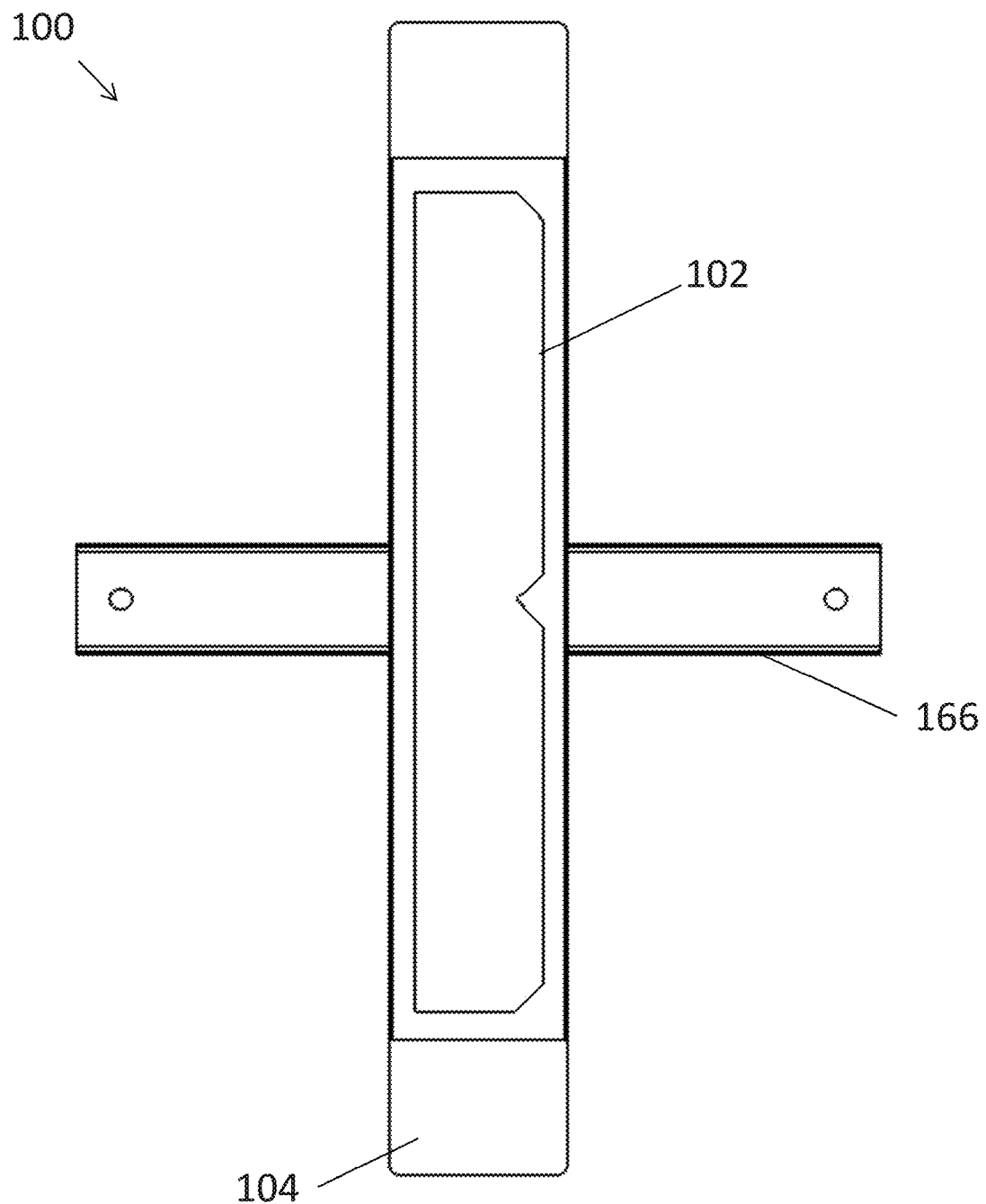
FIG. 6 is a top view of the sign assembly shown in FIG. 1, and illustrating an exemplary solar panel along a top of the sign assembly.
Figure 7:
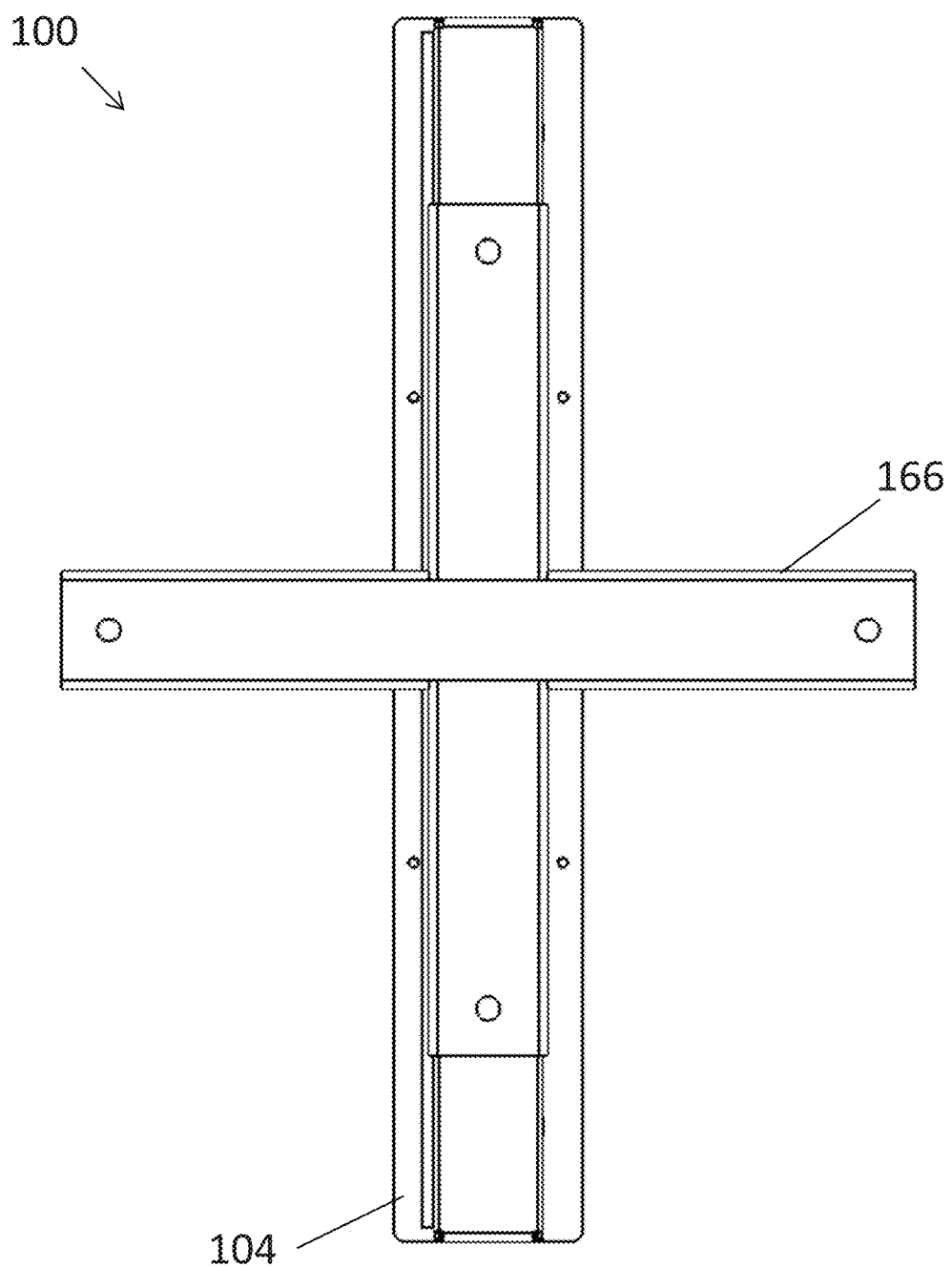
FIG. 7 is a bottom view of the sign assembly shown in FIG. 1, and illustrating an exemplary base for mounting or supporting the sign assembly such as in a front yard.

As shown in FIG. 5, the sign assembly 100 includes front and back drip edges 120 configured (e.g., sized, shaped, located, etc.) to be disposed above or over the respective front and back signs. In this example, the drip edges 120 are defined by a top piece 122 that is soldered to a top wall 124 of the housing 104. In addition, the housing 104 may also include weep holes 126 (FIG. 3) at the bottom corners between the bottom wall 128 and sidewalls 130. The housing 104 may additionally or alternatively include one or more weep holes 132 (FIG. 2) along the bottom wall 128. The weep holes 126 and 132 allow water to weep or drain out of the housing 104.

Figure 16:
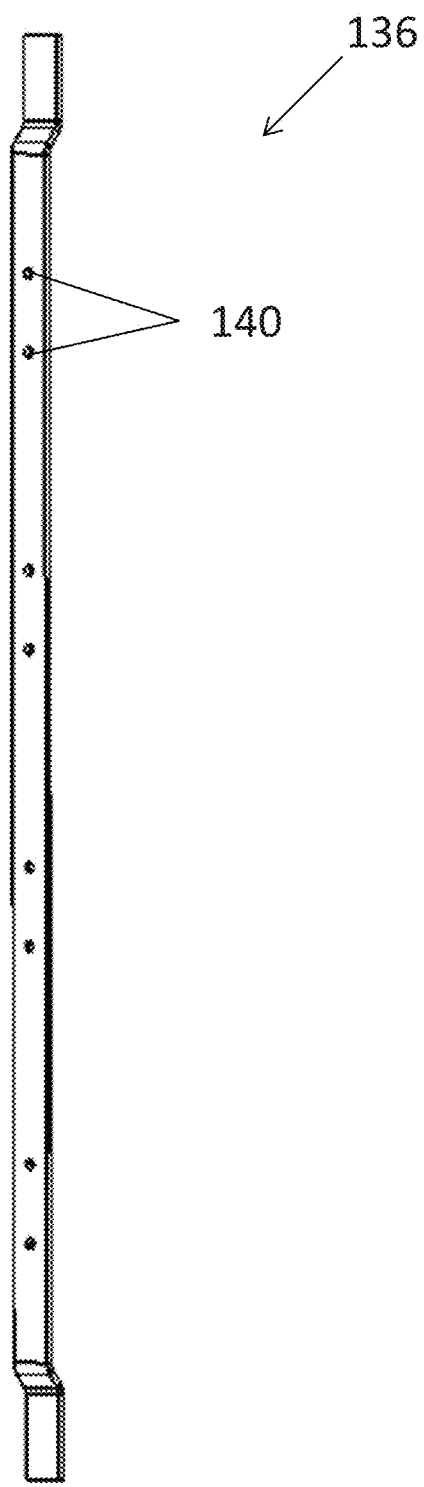
FIG. 16 is a perspective view of an LED mount bar that may be mounted (e.g., mechanically fastened, welded, etc.) along the inner sidewalls of the housing of the sign assembly shown in FIG. 1 and FIG. 8.

With continued reference to FIGS. 1 and 2, two LED mount bars 136 are mounted (e.g., soldered, mechanically fastened, etc.) inside the housing 104 respectively along the inner surfaces of the opposing housing sidewalls 130. As shown in FIG. 16, the LED mount bar 136 includes four pairs of fastener holes 140. An LED board 108 (FIG. 22) may be mounted to each pair of fastener holes 140. Four separate LED boards 108 may thus be mounted to each LED mount bar 136 via mechanical fasteners 144. Alternative embodiments may include LED boards 108 attached (e.g., adhesively attached, etc.) to the housing 104 via any other suitable method.

With continued reference to FIG. 22, each LED board 108 includes three LEDs 106. Accordingly, this exemplary embodiment includes eight boards 108 each having three (3) LEDs 106 thereon, such that there is a total of twenty-four (24) LEDs.

In addition the LEDs 106, the board 108 may also include an LED driver (e.g., a linear integrated circuit (IC) LED driver, etc.) to drive the LEDs 106 on the board 108. The board 108 may also include a pair of connectors 152 (e.g., thru-wire or poke-in connectors, etc.) at each end for electrically connecting the LED boards 108 to each other and to the battery.

By way of example only, the LEDs 106 may be 120 degree LEDs, which are arranged to disperse the light in a relatively even manner across the front and/or back signs. The inventors hereof selected 120 degree LEDs after a test that worked out well. In an exemplary embodiment, the LEDs are coupled to inner surfaces of the first and second sidewalls of the housing such that light from the LEDs passes through an interior of the housing to illuminate one or more signs when attached to the housing whereby dark spots and uneven illumination is reduced. Continuing with this example, a first set of 120 degree LEDs may be coupled to the inner surface of the first sidewall such that the first set of 120 degree LEDs is spaced apart a predetermined or calculated distance (e.g., 0.27 inches, etc.) inwardly from the inner surface of the first sidewall. A second set of 120 degree LEDs may be coupled to the inner surface of the second sidewall such that the second set of 120 degree LEDs is spaced apart a predetermined or calculated distance (e.g., 0.27 inches, etc.) inwardly from the inner surface of the second sidewall. This positioning of the first and second sets of 120 degree LEDs relative to (e.g., spaced apart from, etc.) the inner surfaces of the respective first and second housing sidewalls helps to maximize (or at least increase or enhance) light distribution on the front and back sides of the housing by accommodating for the 120 degree viewing angle of the first set of 120 degree LEDs.

But other embodiments may include more or less LEDs and/or other suitable light sources besides LEDs. For example, other different varieties of LEDs that put off a softer white light and/or disperse light at different angles may also be used. The LEDs may have a backing on them in order to protect them from shorting out when attached to the inside of the housing or box, which may be made of metal.

By way of example only, the LEDs 106 may comprise LEDs having features as set forth in the table below. Alternative embodiments may have different light sources, such as one or more LEDs with different features than set forth in the table below or other light sources besides LEDs. Other exemplary embodiments may include differently configured LEDs, LED boards, other suitable light sources, any suitable number of LED boards each having any suitable number of LEDs thereon. For example, there may be six boards each having three (3) LEDs thereon, such that there is a total of eighteen (18) LEDs. Accordingly, the LED board 108 shown in FIG. 22 is but one example as different LED boards and/or light sources may be used in other exemplary embodiments.

| Color | White, Cool |
|---|---|
| Millicandela Rating | 2345mcd |
| Voltage - Forward (Vf) Type | 3.05 V |
| Current - Test | 20 mA |
| Wavelength - Dominant | 6500K |
| Viewing Angle | 120° |
| Lens Type | Diffused, Tinted |
| Lens Style/Size | Rectangle with Flat Top, 2.3 mm × 1.15 mm |
| Size/Dimension | 3.00 mm L × 1.40 mm W |
| Height | 1.20 mm |
| Mounting Type | Surface Mount |
| Luminous Flux @ Current - Test | 6.9 lm |

Figure 11:
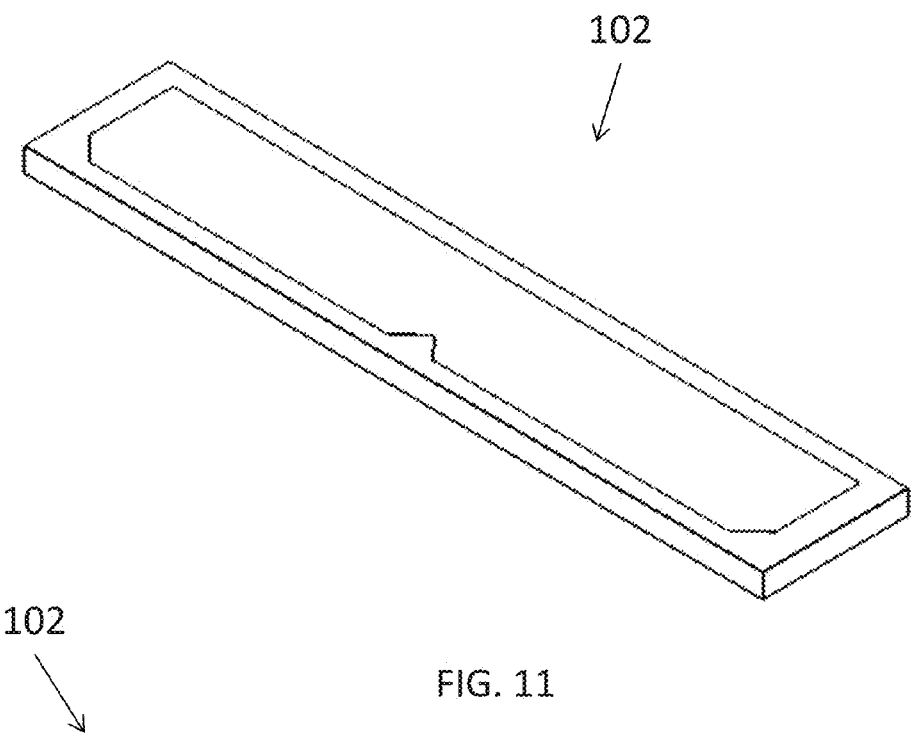
FIG. 11 is an upper perspective view of the solar panel shown in FIG. 9 after having been removed from the housing as shown in FIG. 10.

As shown in FIG. 1, the solar panel 102 is coupled (e.g., adhesively attached, mechanically fastened, etc.) to the top of the sign assembly 100. In this example, the solar panel 102 is mechanically fastened via screws 154 to the top piece 122, which, in turn, is coupled to the top wall 124 of the housing 104. As shown in FIG. 11, the solar panel 102 includes fastener holes 156 that are alignable with corresponding holes 156 (FIG. 9) in the top piece 122. FIG. 9 also illustrates an opening 158 in the top piece 122 and top wall 124 of the housing 104 through which wiring may pass to electrically connect the solar panel 102 to other components (e.g., battery, and/or solar controller 160, etc.) that are inside the housing 104. The solar controller 160 may be coupled (e.g., mechanically fastened, etc.) to a lower surface of a platform 161 generally underneath the platform 161 as shown in FIG. 2. The platform may also be used to support one or more batteries, e.g., when the one or more batteries are positioned on top of the platform 161.

The solar panel 102 is wired into a solar controller or voltage regulator 160. In operation, the solar panel 102 collects solar energy that is used for charging the battery. The solar panel 102 may be pitched at a one degree angle so that water does not pool or remain on the solar panel 102 but instead will run off.

In this exemplary embodiment, the solar panel 102 is a 5 watt, 12 volt solar panel. But different solar panels may be used in other embodiments depending on the particular number and/or type of battery(ies) (e.g., battery voltage rating, etc.) and/or the particular number and/or type of light source(s). A solar panel having a voltage rating greater than 12 volts may be used if the capacity of the battery(ies) and/or LEDs is increased. For example, an 18 volt solar panel may be used with a 12 volt battery as the solar panel should preferably have a higher voltage rating than the rating on the battery.

Continuing with a description of the example solar panel 102, a 5 watt solar panel is used in this exemplary embodiment in order to replace the usage on the LEDs 106 and recharge following a night's battery usage. If more LEDs are used in other embodiments, then a larger solar panel with a wattage rating higher than 5 watts may be used, though the solar panel voltage level may remain the same at 12 volts. If a solar panel with a higher wattage rating is used, then one or more batteries with a larger capacity (e.g., batteries with a higher mAH rating, etc.) may preferably be used to hold the charge supplied by the larger solar panel. Any number of LED boards (e.g., more or less than eight LED boards, etc.) may be used in a sign assembly according to the present disclosure. For example, another exemplary embodiment of a sign assembly may include more than eight LED boards each having three LEDs thereon. In such embodiment, the sign assembly may then preferably include one or more larger capacity battery(ies) and one or more higher wattage solar panels to allow the LEDs to produce light the entire night.

The solar controller 160 includes a component (e.g., see circuits in FIG. 21 in the box labeled 10V 5 W constant voltage boost supply, etc.) operable for boosting the battery output to a level that is preferably optimized for the LEDs 106. For example, the solar controller 160 may be operable to boost the output of a 7.2 volt battery to a higher level (e.g., at least 10 volts, 12 volts, etc.) depending on the particular LEDs being used. For "white" LEDs, the boosted voltage level may preferably be about 12 volts depending on the LEDs (e.g., 12 volt rated LEDs, etc.). In an exemplary embodiment, the solar controller 160 is configured to boost the battery voltage output to only 10 volts even though the LEDs 106 have a 12 volt rating in order to save or extend battery life. When different LEDs are used, the solar controller 160 may be reconfigured to boost and reoptimize the battery voltage output. At night, the solar panel is inactive as the battery voltage is boosted by the solar controller to electrically power the LEDs.

The solar panel, solar controller, and battery configuration may be operable for lighting up a sign for about 10 hours or for about 6 to 8 hours, etc. By way of example, the battery may be a 7.2 volt 6-cell nickel metal hydride (NiMH) battery, which the inventors selected after trying different batteries. The inventors found that this nickel metal hydride is preferable for their illuminable sign assemblies as it does not keep a battery memory like traditional lithium ion batteries. Using nickel metal hydride allows the solar controller to drain the battery farther down than would a lithium ion battery. But other embodiments may include one or more different batteries, such as a battery that is more or less than 7.2 volts and/or a battery that is not nickel metal hydride (e.g., lithium ion battery, etc.).

The solar controller 160 is operable to prevent or inhibit the overcharging and discharging to protect the battery. The solar controller 160 is configured to help with voltage management. By way of example, when it gets dark, the resistance on the circuit drops. Then, the solar controller 160 reads the current voltage on the battery. If the battery voltage is high enough to indicate that it has some charge available, the battery will supply voltage to the LEDs 106. When that happens, the LEDs 106 turn on and produce light. While the LEDs 106 are on, the controller 160 reads the battery voltage. If battery voltage gets too low, the controller 160 will stop allowing the battery to supply voltage to the LEDs 106.

But with an NIMH battery, the voltage plunges when initially supplying power, which initial voltage plunge had to be accommodated otherwise the controller would stop sending voltage to the LEDs 106. Accordingly, the system controller 160 is configured to manage the fluctuations in voltage when supplying the power to LEDs 106. In this exemplary embodiment, the solar controller 160 was reconfigured in such a way to manage the power with resistors.

FIG. 21 illustrates an example solar controller 160 that may be used in exemplary embodiments. As shown, the solar controller 160 includes or is configured with the following features, components or controls: ambient light detection on-off control, undervoltage lockout, and 10V 5 W constant voltage boost supply. With continued reference to FIG. 21, the solar controller 160 includes capacitors C1 to C4, diodes D1 to D5, an inductor L1, mosfet Q1 and Q2, resistors R1 to R7 and R9 to R14, and integrated circuits (IC) U1 (voltage regulator boost), U2 (comparator), and U3 (comparator). The solar controller 160 also includes connectors for the battery J1 and J2, solar panel J3 and J4, and LEDs J5 and J6. By way of example only, example values for components of the solar controller 160 are set forth in the table below. But these values are examples only as alternative embodiments may have a solar controller configured differently, e.g., have different features and/or components with higher or lower values, etc.

| | |
|---|---|
| C1 | CAPACITOR CERAMIC 2.2 UF 16 V 10% X7R 0805 |
| C2 | CAPACITOR CERAMIC 10 UF 25 V 10% X5R 1206 |
| C3, C4 | CAPACITOR CERAMIC 0.1 UF 50 V 10% X7R 0805 |
| D1-4 | DIODE SCHOTTKY 40 V 1 A SOD123 |
| D5 | DIODE ZENER 5.1 V 225 MW SOT-23 |
| L1 | INDUCTOR 10UH 1.9 A 20% SMD |
| J1-J6 | CONNECTOR SINGLE POKE CONTACT 12-20AWG |
| Q1 | MOSFET P-CH 20 V 4.2 A SOT-23 |
| Q2 | MOSFET N-CH 60 V 260 MA SOT-23 |
| R1 | RESISTOR 36K OHM ⅛ W 1% 0805 SMD |
| R2 | RESISTOR 4.99K OHM ⅛ W 1% 0805 SMD |
| R3-R7 | RESISTOR 100K OHM ⅛ W 5% 0805 SMD |
| R9 | RESISTOR 750K OHM ⅛ W 1% 0805 SMD |

| | |
|---|---|
| R10 | RESISTOR 43K OHM ⅛ W 1% 0805 SMD |
| R11 | RESISTOR 205K OHM ⅛ W 1% 0805 SMD |
| R12 | RESISTOR 787K OHM ⅛ W 1% 0805 SMD |
| R13 | RESISTOR 39K OHM ⅛ W 5% 0805 SMD |
| R14 | RESISTOR 174K OHM ⅛ W 1% 0805 SMD |
| U1 | IC REG BOOST ADJ 1 A TSOT23-5 |
| U2 | IC COMPARATOR W/REFERENCE PUSH-PULL SC70-5 |
| U3 | IC COMPARATOR W/REFERENCE PUSH-PULL SC70-5 |

Dielectric spacers may be disposed behind or underneath the LED boards 108 and solar control board 160 such that the dielectric spacers are between the boards 108 and 160 and the housing or sign box 104. The dielectric spacers prevent direct electrical contact and grounding of the boards 108, 160 with the housing or sign box 104. By way of example only, FIG. 23 illustrates an example dielectric spacer 164 (e.g., ⅛ inch flanged nylon spacer for no. 4 screw, etc.) that may be used in exemplary embodiments.

Figure 10:
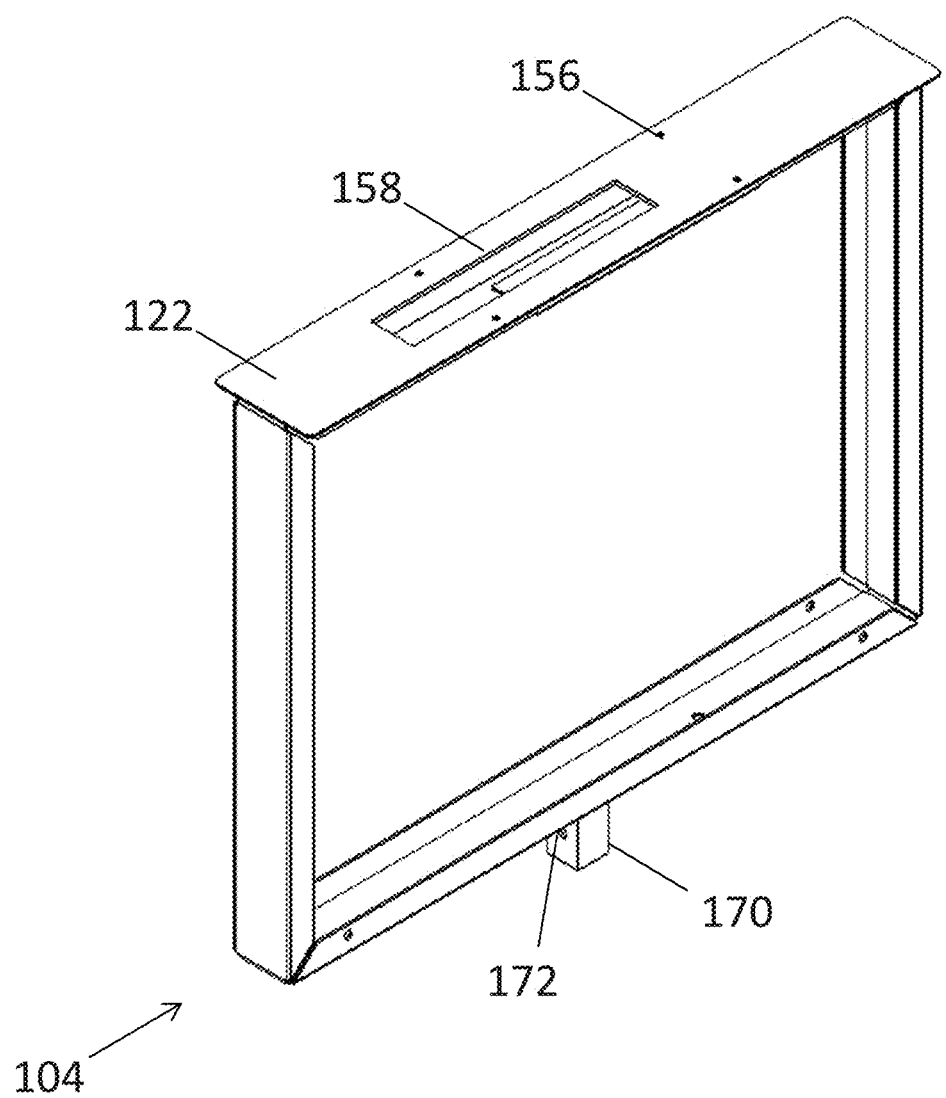
FIG. 10 is an upper perspective view of the housing shown in FIG. 9 without the solar panel to illustrate an opening in the top of the housing through which wiring may pass to electrically connect the solar panel to components (e.g., battery and/or solar controller, etc.) inside the housing.

With reference back to FIGS. 1 and 2, the sign assembly 100 also includes a base or stand 166 and a post 168 for supporting the sign assembly 100 on the ground (e.g., front yard, etc.) or other suitable support surface (e.g., driveway, etc.). The post 168 is coupled (e.g., mechanically fastened via nuts and bolts, etc.) to the base 166 and a lower tubular portion 170 (FIGS. 10 and 13) extending downward from the housing 104. The housing's lower tubular portion 170 includes fastener holes 172 that are alignable with corresponding fastener holes 174 (FIG. 19) when the housing's lower tubular portion 170 is slid or slip fit into the top open portion 176 of the post 168. The post 168 also includes bottom fastener holes 178 that are alignable with corresponding fastener holes 180 (FIG. 15) of the base 166 when the post 168 is slid or slip fit between the opposing flanges 182 of the base 166. Alternatively, the base may include a tubular portion having fastener holes as shown in FIG. 30, where the tubular portion of the base is configured to receive the bottom portion of a post therein.

Figure 15:
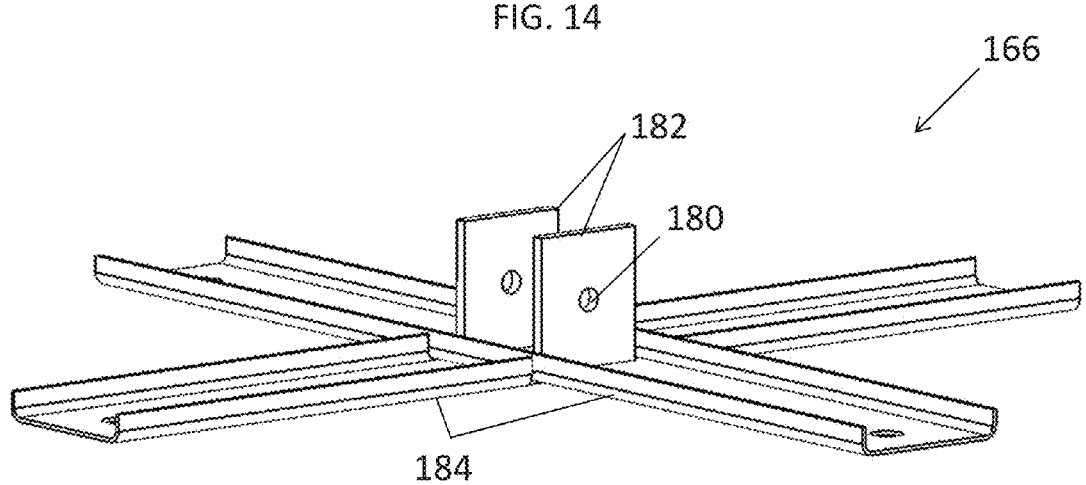
FIG. 15 is a perspective view of the base of the sign assembly shown in FIG. 1 and FIG. 8.

As shown in FIGS. 1 and 15, the base 166 includes four arms, legs, or members 184 configured to define a T-shape or cross-shape. Each member 184 includes openings 186 to allow stakes or other suitable retention means to be inserted therethrough. For example, stakes may be inserted through the openings 186 in the stand 166 and then driven into the ground to help hold the sign assembly 100 down and in place, such as in strong winds, etc. Alternative embodiments may include a differently configured base (e.g., different shape, etc.) and/or different retention means to help hold the sign assembly down.

In exemplary embodiments, the solar powered sign assembly is reconfigurable such that is may be used on a horizontal support surface or a sloped support surface. In such exemplary embodiments, the one or more signs remain fully viewable by a passerby even when the solar powered sign assembly is used on a sloped or slanted support surface if reconfigured accordingly. The sign assembly may include a reconfigurable base assembly that allows the solar powered sign assembly to be used on a horizontal or slanted support surface.

FIG. 8 illustrates an exemplary embodiment of a solar powered sign assembly having a neck pivot retainer 187 (broadly, a component or coupler). The neck pivot retainer 187 allows adjustment to the angle of the housing 104 and sign or display medium 110 relative to the base 166 and ground or other support surface on which the sign assembly is being used. In this example embodiment shown in FIG. 8, the other components (e.g., solar panel, housing 104, LEDs 106, stand 166, etc.) may be identical or substantially similar to the corresponding components of the sign assembly 100 shown in FIGS. 1 through 7 and described above.

As shown in FIG. 18, the neck pivot retainer 187 is coupled to a neck pivot post 188 by a clevis pin 189 and a headless clevis pin 190 with retaining rings. The neck pivot post 188 is also shown in FIG. 19. The clevis pins 189 and 190 are also shown in FIG. 20. When used with the sign assembly shown in FIG. 8, the angle of the sign may be adjusted by removing the clevis pin 189 and inserting it through a different set of aligned holes 191 in the neck pivot retainer 187. In the illustrated embodiment (FIG. 17), the neck pivot retainer 187 includes ten different sets of aligned holes 191, thus allowing a user to select from among ten different angular or rotational settings for the sign assembly, e.g., depending on the angle or steepness of a hillside on which the sign assembly is used, etc.

As shown in FIG. 18, the neck pivot post 188 includes holes 192 that are alignable with the corresponding fastener holes 180 (FIG. 15) in the stand 166. As shown in FIG. 8, the open portion 193 of the neck pivot post 188 may be slid or slip fit between the flanges 182 of the stand 166. Alternatively, the relative sizing may be reversed such that the flanges 182 of the stand are slidable or slip fittable into the open portion 193 of the neck pivot post 188.

In other exemplary embodiments, the neck pivot post 188 may be rotated 180 degrees such that its holes 192 are instead alignable with corresponding fastener holes 172 (FIG. 10) in the housing's lower tubular portion 170 when the housing's lower tubular portion 170 is slid or slip fit into the portion 193 of the neck pivot post 188. Alternatively, the relative sizing may be reversed such that the portion 193 of the neck pivot post 188 is slidable or slip fittable into the bottom portion of the lower tubular portion 170 of the housing 104.

The neck pivot post 188 also includes holes 194 (e.g., oblong or oval-shaped holes, etc.) and holes 195 (e.g., circular holes, etc.) for respectively receiving the clevis pins 189 and 190 therein. The holes 194 of the neck pivot post 188 are alignable with the different sets of aligned holes 191 of the neck pivot retainer 187, while the holes 195 of the neck pivot post 188 are alignable with the holes 196 of the neck pivot retainer 187.

As shown in FIG. 17, the pivot retainer 187 includes holes 197 that are alignable with corresponding fastener holes 172 (FIG. 10) in the housing's lower tubular portion 170 when the housing's lower tubular portion 170 is slid or slip fit into the open portion 198 of the neck pivot retainer 187 (FIG. 8). Alternatively, the relative sizing may be reversed such that the portion 198 of the neck pivot retainer 187 is slidable or slip fittable into the housing's lower tubular portion 170.

In other exemplary embodiments, the neck pivot retainer 187 may be rotated 180 degrees such that its holes 197 are alignable with the corresponding fastener holes 180 (FIG. 15) in the stand 166. In such embodiments, the portion 198 of the neck pivot retainer 187 may be slid or slip fit between the flanges 182 of the stand 166. Alternatively, the relative sizing may be reversed such that the flanges 182 of the stand are slidable or slip fittable into the open portion 198 of the neck pivot retainer 187.

With this means for pivoting or rotating the sign relative to the base, the angle of the sign relative to the base may be easily and fully viewed by a passerby even when the sign assembly is on a hillside or uneven, slanted, sloped surface. The angle of the sign may be adjusted by removing the clevis pin 189 and inserting it through a different set of holes 191 in the neck pivot retainer 187.

In this illustrated embodiment, the clevis pin 189 allows for a relatively easy and quick adjustment to the angle of the sign by removing the clevis pin 189 and then inserting it through a different set of aligned holes 191 in the neck pivot retainer 187. Alternative embodiments may include other means for adjustment of the angle of the sign to allow it to be used on a slope, such as a neck pivot retainer having more or less than 10 sets of aligned holes, different mechanical fasteners (e.g., nuts and bolts, other slid fit pins, etc.) besides the clevis pins, etc.

A wide range of materials may be used for the various components of a solar powered sign assembly according to exemplary embodiments. In an exemplary embodiment, the front and/or back signs or display mediums (e.g., sign 110 (FIG. 14), etc.) may be made from polystyrene with artwork, images, designs, etc. added at or provided by a commercial printer. Alternatively, the signs or display mediums may be made from other materials (e.g., vinyl, etc.) that are preferably not opaque (e.g., light-transmissive, translucent, etc.) such that at least some light will pass therethrough for backlighting purposes.

The housing or sign box (e.g., housing 104 (FIG. 1), housing (FIGS. 24 and 25), etc.) may be made of aluminum and have a white powder coating finish. The LED mount bars (e.g., LED mount bars 136 (FIGS. 1, 2, and 16), LED mount bar (FIG. 26), etc.) may be formed of aluminum.

The neck pivot retainer or component (e.g., retainer 187 (FIGS. 17 and 18), retainer (FIG. 28), etc.) may be made of 6061 aluminum and have a white powder coating finish. The neck pivot post (e.g., post 188 (FIGS. 18 and 19), post (FIG. 29), etc.) may be made of 6061 aluminum and have a white powder coating finish. The neck pivot post may be configured (e.g., dimensionally sized, shaped) to allow a tubular portion (e.g., 1.25 inch square tube portion, etc.) to be slid or slip fit inside the neck pivot post.

The sign post (e.g., sign post 168 (FIGS. 1-7 and 19), sign post (FIG. 31), etc.) may be made of 6061 aluminum and have a white powder coating finish. The sign post may be configured (e.g., dimensionally sized, shaped) to slide or slip into tubular portions or receivers of the base, sign box or housing, and/or neck pivot retainer.

The base (e.g., base 166 (FIGS. 1-7 and 15), base (FIG. 30), etc.) may be made of steel and have a white powder coating finish. The base may be formed by cutting one of two sheet metal strips for relief in the bends so that the other sheet metal strip may fit inside of the cut sheet metal strip, e.g., for welding. The two sheet metal pieces may be square or at right angles to each other after being coupled, e.g., welded, together. The base may include a tubular upstanding portion that is configured (e.g., dimensionally sized 2 inches by 0.25 inches and shaped, etc.) to allow another tubular portion (e.g., 1.5 inch square tubing, etc.) to slide or slip fit inside the tubular portion of the base.

In an alternative exemplary embodiment, the frame, enclosure, shell, box, or housing of the inventors' illuminable sign assembly is sheet metal that has been bent for the 2 sides and the bottom. The top is another piece of metal placed over and coupled (e.g., riveted, welded, etc.) to the two sides to hold them in place. Metal fabrication may be used for cost reasons and/or to avoid static electricity build up. But other embodiments may include a shell, box, or housing formed of other suitable materials, e.g., plastic, moldable materials, etc.

Alternative exemplary embodiments may include snaps attached (e.g., mechanically fastened, adhesively attached, etc.) to the housing or box of the sign assembly. The snaps may be used for holding a sign or display medium having corresponding snaps to the housing so that light from the light sources (e.g., LEDs, etc.) within the housing will illuminate or light up the sign, e.g., at a relatively even rate. In this example, the snaps may be riveted to front and/or back lips of the housing of the sign assembly. The sign (e.g., polystyrene or vinyl sign, etc.) may be snapped onto the front or back of the housing allowing the light to illuminate the sign (e.g., backlit, edgelit, allow light to pass through the sign, etc.) when the sun is no longer charging the battery through the solar panel. In an exemplary embodiment, light may travel from LEDs within the housing through the sign (e.g., backlighting) and/or around the edges of the sign (e.g., edge lighting) without having or requiring any light dispersion material between the LEDs and the sign.

Alternative embodiments may include grommets for adhering the sign to the frame. The sides of the frame may also be changed to include a small piece of material (e.g., metal, etc.) to hide the sides of the sign or sheet to avoid the unprofessional appearance of any ragged edges of the sign.

Alternative embodiments of the inventors' illuminable sign assemblies may include an upside down "U" shaped rod for attaching or staking the sign to the ground. The rod may run along the bottom of the inside of the sign's box or housing. The rod may be held together with a metal plate that secures the rod to the bottom of the sign's box. The two legs of the upside down "U" may be placed or driven into the ground. Other exemplary embodiments may include other devices for supporting the sign upright in a yard, such as other stake configurations (e.g., stakes to stably support the sign in windy conditions, etc.) and/or other devices (e.g., base having a sufficiently large flat bottom surface, etc.) that are capable of holding the sign upright without having to form holes in the ground.

By way of example, FIGS. 24 through 31 provide exemplary dimensions for a solar powered sign assembly for purpose of illustration only. For example, an exemplary embodiment of the sign assembly may include a rectangular housing or box (e.g., sheet metal, plastic, aluminum, etc.) that is 25.25 inches wide, 19.5 inches tall, and 4 inches thick. But other embodiments may include a housing or box that is shaped differently (e.g., triangular, etc.) and/or sized differently, larger, or smaller (e.g., 18 inches×18 inches, 12 inches×12 inches, etc.). Accordingly, different sizes of frame, houses, enclosures, or sign boxes with different LED combinations or other suitable light sources may be used depending, for example, on market research and consumer preferences.

The signs may include a wide range of images, messages, artwork, pictures, etc. By way of example, one of a plurality of interchangeable signs may be selectively used with the inventors' solar powered sign assembly, such as a home for sale sign, an advertisement for a contractor's work on the house, a political or campaign sign, etc. Aspects of the present disclosure should not limited to use as front yard signs only or limited to use with any particular type of sign, message, display, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used as the display medium, different light sources, different means for coupling the display medium to the sign, etc.) and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances (e.g., +/−0.01 inches for dimensions given with two place decimals, +/−0.03 inches for dimensions given with three place decimals, etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solar powered sign assembly comprising:
 a housing;
 one or more batteries within the housing;
 one or more light emitting diodes (LEDs) within the housing and having a volt rating higher than the one or more batteries;
 one or more signs attachable to the housing for receiving light from the LEDs to illuminate the one or more signs when attached to the housing;
 one or more solar panels external to the housing for collecting solar energy for charging the one or more batteries; and
 a controller within the housing, the controller electrically connected to the one or more LEDs, the one or more batteries, and the one or more solar panels,
 whereby the controller is operable for boosting battery output to a higher level that is equal to or closer to the volt rating of the one or more LEDs to electrically power the one or more LEDs to produce light that illuminates the one or more signs when attached to the housing,
wherein the one or more signs comprise a plurality of different interchangeable signs each of which is removably attachable to the housing so as to extend across a front and/or back portion of the housing to thereby receive light from the one or more LEDs;
wherein the housing includes first and second sidewalls having inner surfaces and outer surfaces, the outer surfaces of the first and second sidewalls defining oppositely facing exterior side edge portions of the housing;
wherein the LEDs comprise:
 a first set of LEDs spaced apart from each other along the inner surface of the first sidewall; and
 a second set of LEDs spaced apart from each other along the inner surface of the second sidewall;
whereby the first and second sets of LEDs are operable for edge lighting signs that are removably attached to the housing and that extend across the front and back portions of the housing, such that light from the first and second LEDs may travel within the housing around edges of and through the signs.

2. The solar powered sign assembly of claim 1, wherein the controller is operable for preventing overcharging and discharging of the one or more batteries, and wherein the controller is operable for boosting battery output to the higher level, which is less than the volt rating of the one or more LEDs to save or extend battery life.

3. The solar powered sign assembly of claim 1, wherein the controller is operable to determine current voltage on the one or more batteries such that:
 when battery voltage is determined to be high enough, the controller allows the one or more batteries to supply electrical energy for operating the one or more LEDs; and
 when battery voltage is determined to be too low, the controller will not allow the one or more batteries to supply electrical energy to the one or more LEDs.

4. The solar powered sign assembly of claim 1, wherein the controller includes ambient light detection on-off control and undervoltage lockout.

5. The solar powered sign assembly of claim 1, wherein the one or more solar panels comprise a solar panel affixed to an outer surface of a top wall of the housing such that the solar panel is pitched at an angle.

6. The solar powered sign assembly of claim 1, wherein:
the housing including a plurality of fastener holes; and
the one or more signs include a plurality of corresponding holes alignable with the fastener holes in the housing such that the one or more signs are attachable to the housing by mechanical fasteners inserted through the holes.

7. The solar powered sign assembly of claim 1, further comprising at least one light-transmissive sign that is attachable to the housing so as to extend across a front and/or back portion of the housing to thereby receive light from the one or more LEDs and allow at least some of the light to pass therethrough.

8. The solar powered sign assembly of claim 1, wherein the one or more solar panels comprise a solar panel affixed to an outer surface of a top wall of the housing that is configured to extend outwardly beyond the one or more signs attached to the housing, thereby sheltering top edges of the one or more signs.

9. The solar powered sign assembly of claim 8, wherein:
the one or more signs are water resistant; and/or
a sealing material is disposed around a perimeter of the one or more signs to inhibit water seepage along edges of the one or more signs into an interior of the housing.

10. A solar powered sign assembly comprising:
a housing;
one or more batteries within the housing;
one or more light emitting diodes (LEDs) within the housing and having a volt rating higher than the one or more batteries;
one or more signs attachable to the housing for receiving light from the LEDs to illuminate the one or more signs when attached to the housing;
one or more solar panels external to the housing for collecting solar energy for charging the one or more batteries; and
a controller within the housing, the controller electrically connected to the one or more LEDs, the one or more batteries, and the one or more solar panels, whereby the controller is operable for boosting battery output to a higher level that is equal to or closer to the volt rating of the one or more LEDs to electrically power the one or more LEDs to produce light that illuminates the one or more signs when attached to the housing;
wherein the one or more batteries comprise a 7.2 volt nickel metal hydride rechargeable battery, whereby the controller is operable for boosting output of the 7.2 volt nickel metal hydride rechargeable battery to at least 10 volts.

11. A solar powered sign assembly comprising:
a housing;
one or more batteries within the housing;
one or more light emitting diodes (LEDs) within the housing and having a volt rating higher than the one or more batteries;
one or more signs attachable to the housing for receiving light from the LEDs to illuminate the one or more signs when attached to the housing;
one or more solar panels external to the housing for collecting solar energy for charging the one or more batteries; and
a controller within the housing, the controller electrically connected to the one or more LEDs, the one or more batteries, and the one or more solar panels, whereby the controller is operable for boosting battery output to a higher level that is equal to or closer to the volt rating of the one or more LEDs to electrically power the one or more LEDs to produce light that illuminates the one or more signs when attached to the housing;
wherein:
 the housing includes first and second sidewalls having inner surfaces and outer surfaces, the outer surfaces of the first and second sidewalls defining oppositely facing exterior side edge portions of the housing; and
 first and second LED mount bars are directly coupled to the inner surfaces of the respective first and second sidewalls, one or more LED boards are mounted to the first and second LED mount bars, the one or more LED boards including the LEDs, and the LEDs are spaced apart from each other and extend from top to bottom along the inner surfaces of the first and second sidewalls, such that light from the LEDs passes through an interior of the housing to illuminate the one or more signs when attached to the housing.

12. A solar powered sign assembly comprising:
a housing;
one or more batteries within the housing;
one or more light emitting diodes (LEDs) within the housing and having a volt rating higher than the one or more batteries;
one or more signs attachable to the housing for receiving light from the LEDs to illuminate the one or more signs when attached to the housing;
one or more solar panels external to the housing for collecting solar energy for charging the one or more batteries; and
a controller within the housing, the controller electrically connected to the one or more LEDs, the one or more batteries, and the one or more solar panels, whereby the controller is operable for boosting battery output to a higher level that is equal to or closer to the volt rating of the one or more LEDs to electrically power the one or more LEDs to produce light that illuminates the one or more signs when attached to the housing;
wherein:
the housing includes first and second sidewalls having inner surfaces and outer surfaces, the outer surfaces of the first and second sidewalls defining oppositely facing exterior side edge portions of the housing; and
the LEDs comprise:
a first set of 120 degree LEDs coupled to and spaced apart along the inner surface of the first sidewall such that the first set of 120 degree LEDs is spaced apart a predetermined distance inwardly from the inner surface of the first sidewall to accommodate a 120 degree viewing angle of the first set of 120 degree LEDs; and
a second set of 120 degree LEDs coupled to and spaced apart along the inner surface of the second sidewall such that the second set of 120 degree LEDs is spaced apart a predetermined distance inwardly from the inner surface of the second sidewall to accommodate a 120 degree viewing angle of the second set of 120 degree LEDs.

13. A solar powered sign assembly comprising:
a housing;
one or more batteries within the housing;
one or more light emitting diodes (LEDs) within the housing and having a volt rating higher than the one or more batteries;
one or more signs attachable to the housing for receiving light from the LEDs to illuminate the one or more signs when attached to the housing;
one or more solar panels external to the housing for collecting solar energy for charging the one or more batteries;
a controller within the housing, the controller electrically connected to the one or more LEDs, the one or more batteries, and the one or more solar panels, whereby the controller is operable for boosting battery output to a higher level that is equal to or closer to the volt rating of the one or more LEDs to electrically power the one or more LEDs to produce light that illuminates the one or more signs when attached to the housing; and
a stand and a post coupled to the stand for supporting the solar powered sign assembly on the ground, the stand includes one or more openings configured to receive one or more stakes to be driven into the ground to help hold the solar powered sign assembly down and in place; and wherein the solar powered sign assembly is reconfigurable for use on a horizontal support surface or a sloped support surface, whereby the one or more signs may remain fully viewable by a passerby when the solar powered sign assembly is reconfigured and used on the sloped support surface.

14. The solar powered sign assembly of claim 13, further comprising a plurality of different interchangeable signs each of which is removably attachable to the housing so as to extend across a front and/or back portion of the housing to thereby receive light from the one or more LEDs, and wherein:
the housing includes first and second sidewalls having inner surfaces and outer surfaces, the outer surfaces of the first and second sidewalls defining oppositely facing exterior side edge portions of the housing;
the one or more LEDs comprise:
a first set of LEDs spaced apart from each other along the inner surface of the first sidewall; and
a second set of LEDs spaced apart from each other along the inner surface of the second sidewall;
whereby the first and second sets of LEDs are operable for edge lighting signs that are removably attached to the housing and that extend across the front and back portions of the housing, such that light from the first and second LEDs may travel within the housing around edges of and through the signs.

15. A solar powered sign assembly comprising:
a housing including first and second sidewalls having inner surfaces and outer surfaces, the outer surfaces of the first and second sidewalls defining oppositely facing exterior side edge portions of the housing;
one or more light sources within the housing, the one or more light sources are spaced apart from each other such that the one or more light sources extend from top to bottom along the inner surfaces of the first and second sidewalls;
one or more light-transmissive signs attachable to the housing so as to extend across a front and/or back portion of the housing to thereby receive light from the one or more light sources and allow at least some of the light to pass therethrough;
one or more solar panels external to the housing for collecting solar energy for charging one or more batteries; and
a controller within the housing and electrically connected to the one or more light sources and the one or more solar panels.

16. The solar powered sign assembly of claim 15, wherein:
the one or more batteries are within the housing and electrically connected to the controller;
the one or more light sources comprise one or more light emitting diodes (LEDs) having a volt rating higher than the one or more batteries; and
the controller is operable for boosting battery output to a higher level that is less than the volt rating of the one or more LEDs to save or extend battery life or that is about equal to the volt rating of the one or more LEDs.

17. The solar powered sign assembly of claim 15, wherein:
the one or more light sources comprise:
a first set of 120 degree LEDs coupled to and spaced apart along the inner surface of the first sidewall such that the first set of 120 degree LEDs is spaced apart a predetermined distance inwardly from the inner surface of the first sidewall to accommodate a 120 degree viewing angle of the first set of 120 degree LEDs; and a second set of 120 degree LEDs coupled to and spaced apart along the inner surface of the second sidewall such that the second set of 120 degree LEDs is spaced apart a predetermined distance inwardly from the inner surface of the second sidewall to accommodate a 120 degree viewing angle of the second set of 120 degree LEDs;

whereby the first and second sets of 120 degree LEDs are operable for edge lighting the one or more light-transmissive signs when attached to the housing and extending across the front and back portions of the housing, such that light from the first and second sets of 120 degree LEDs may travel within the housing around edges of and through the one or more light-transmissive signs.

18. The solar powered sign assembly of claim 15, wherein:

the housing includes a plurality of fastener holes; and
the one or more light-transmissive signs include a plurality of corresponding holes alignable with the fastener holes in the housing such that the one or more light-transmissive signs are attachable to the housing by mechanical fasteners inserted through the holes.

19. The solar powered sign assembly of claim 15, further comprising a stand and a post coupled to the stand for supporting the solar powered sign assembly on the ground, the stand includes one or more openings configured to receive one or more stakes configured to be driven into the ground to help hold the solar powered sign assembly down and in place; and wherein the solar powered sign assembly is reconfigurable for use on a horizontal support surface or a sloped support surface, whereby the one or more signs may remain fully viewable by a passerby when the solar powered sign assembly is reconfigured and used on the sloped support surface.

* * * * *